United States Patent
Magri et al.

(10) Patent No.: US 12,143,202 B2
(45) Date of Patent: Nov. 12, 2024

(54) OPTICAL NODE AND OPTICAL TRANSCEIVER FOR AUTO TUNING OF OPERATIONAL WAVELENGTH

(71) Applicant: Telefonaktiebolaget LM Ericsson (publ), Stockholm (SE)

(72) Inventors: Roberto Magri, Genoa (IT); Paolo Debenedetti, Genoa (IT); Alberto Deho, Genoa (IT)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 0 days.

(21) Appl. No.: 17/637,943

(22) PCT Filed: Sep. 6, 2019

(86) PCT No.: PCT/EP2019/073875
§ 371 (c)(1),
(2) Date: Feb. 24, 2022

(87) PCT Pub. No.: WO2021/043424
PCT Pub. Date: Mar. 11, 2021

(65) Prior Publication Data
US 2022/0286221 A1    Sep. 8, 2022

(51) Int. Cl.
*H04B 10/00* (2013.01)
*H04J 14/02* (2006.01)

(52) U.S. Cl.
CPC ................. *H04J 14/0257* (2013.01)

(58) Field of Classification Search
CPC .................................... H04J 14/0257
See application file for complete search history.

(56) References Cited

U.S. PATENT DOCUMENTS 5,774,245 A * 6/1998 Baker ............... H04Q 11/0005
398/19
6,061,157 A * 5/2000 Terahara ............ H04J 14/0291
398/1

(Continued)

FOREIGN PATENT DOCUMENTS

EP    2518915 A2    10/2012
EP    2993807 A1    3/2016

OTHER PUBLICATIONS

Gripp, Jürgen, et al., "Optical Switch Fabrics for Ultra-High-Capacity IP Routers", Journal of Lightwave Technology, vol. 21, No. 11, Nov. 2003, pp. 2839-2850.

(Continued)

*Primary Examiner* — Agustin Bello
(74) *Attorney, Agent, or Firm* — Sonoda & Kobayashi Intellectual Property Law; Sarvajit S. Patil

(57) ABSTRACT

An optical node (100) for multiplexing optical signals is disclosed. The optical node (100) comprises an add port (102), a common port (104), an auxiliary port (106), an optical transfer module (110), and a reflecting element (108) coupled to the auxiliary port. The optical transfer module (110) is configured to couple a signal received on the add port (102) and matching an operational wavelength of the optical node (100) to the common port (104), and to couple a signal received on the add port (102) and not matching an operational wavelength of the optical node (100) to the auxiliary port (106). The reflecting element (108) is configured to reflect a signal received on the auxiliary port (106) to the add port (102). Also disclosed are an optical transceiver and methods for operating and optical node and an optical transceiver.

11 Claims, 24 Drawing Sheets

(56) References Cited

U.S. PATENT DOCUMENTS

| | | | | |
|---|---|---|---|---|
| 6,069,719 A * | 5/2000 | Mizrahi | H04J 14/0206 | 398/1 |
| 6,084,050 A * | 7/2000 | Ooba | G02F 1/065 | 398/1 |
| 6,122,416 A * | 9/2000 | Ooba | G02F 1/3132 | 398/1 |
| 6,198,857 B1 * | 3/2001 | Grasis | G02B 6/29365 | 385/47 |
| 6,201,909 B1 * | 3/2001 | Kewitsch | G02F 1/3131 | 385/24 |
| 6,288,811 B1 * | 9/2001 | Jiang | H04J 14/0216 | 398/79 |
| 6,298,186 B1 * | 10/2001 | He | G02B 6/12009 | 385/39 |
| 6,353,497 B1 * | 3/2002 | Zhang | H01S 3/10023 | 359/341.1 |
| 6,385,362 B1 * | 5/2002 | Norwood | G02F 1/3132 | 385/24 |
| 6,466,341 B1 * | 10/2002 | Lumish | H04Q 11/0005 | 398/82 |
| 6,512,613 B1 * | 1/2003 | Tanaka | H04J 14/0206 | 385/27 |
| 6,535,309 B1 * | 3/2003 | Terahara | G02B 6/2932 | 398/79 |
| 6,574,017 B1 * | 6/2003 | Aono | H04B 10/506 | 398/79 |
| 6,611,638 B2 * | 8/2003 | Sakano | G02B 6/2932 | 385/24 |
| 6,707,962 B1 * | 3/2004 | Cai | G02B 6/12021 | 385/24 |
| 6,842,562 B2 * | 1/2005 | Kinoshita | H04J 14/0241 | 385/24 |
| 6,868,201 B1 * | 3/2005 | Johnson | H04J 14/0212 | 385/24 |
| 6,879,434 B2 * | 4/2005 | Aoki | H04B 10/2916 | 398/59 |
| 6,947,670 B1 * | 9/2005 | Korotky | H04J 14/0205 | 398/67 |
| 6,961,522 B1 * | 11/2005 | Castagnetti | H04J 14/0221 | 398/160 |
| 6,963,684 B2 * | 11/2005 | Bhardwaj | G02B 6/12021 | 398/43 |
| 7,212,343 B1 * | 5/2007 | He | G02B 6/29383 | 359/619 |
| 7,224,855 B2 * | 5/2007 | Iazikov | G02B 6/29322 | 385/47 |
| 7,228,021 B2 * | 6/2007 | Jung | G02B 6/29362 | 398/83 |
| 7,239,770 B2 * | 7/2007 | Terada | H04J 14/0212 | 385/20 |
| 7,352,928 B2 * | 4/2008 | Chen | G02B 6/29395 | 385/24 |
| 7,412,124 B1 * | 8/2008 | He | G02B 6/2938 | 385/20 |
| 7,454,143 B1 * | 11/2008 | Wu | G02B 26/02 | 398/85 |
| 7,486,891 B1 * | 2/2009 | Yao | G02B 6/29365 | 398/79 |
| 7,912,374 B1 * | 3/2011 | Wang | G02B 27/1006 | 398/85 |
| 8,488,244 B1 * | 7/2013 | Li | G02B 6/4215 | 398/79 |
| 8,537,468 B1 * | 9/2013 | Wang | G02B 6/29367 | 359/619 |
| 9,419,707 B2 * | 8/2016 | Daems | H04B 10/071 | |
| 10,162,115 B2 * | 12/2018 | Peng | G02B 6/2937 | |
| 11,675,133 B2 * | 6/2023 | Mosti | G02B 6/29362 | 398/139 |
| 2001/0038472 A1 * | 11/2001 | Lee | H04J 14/0241 | 398/3 |
| 2002/0001432 A1 * | 1/2002 | Ueda | G02B 6/12014 | 385/24 |
| 2002/0001433 A1 * | 1/2002 | Hosoi | G02B 6/12016 | 385/24 |
| 2002/0024730 A1 * | 2/2002 | Ducellier | G02F 1/093 | 359/489.15 |
| 2002/0041414 A1 * | 4/2002 | Oguma | H04B 10/07957 | 398/87 |
| 2002/0048065 A1 * | 4/2002 | Shani | H04J 14/0212 | 385/124 |
| 2002/0051603 A1 * | 5/2002 | Hajjar | H04J 14/0221 | 385/24 |
| 2002/0067526 A1 * | 6/2002 | Park | H04J 14/0213 | 398/84 |
| 2002/0081062 A1 * | 6/2002 | He | G02B 6/12016 | 385/24 |
| 2002/0089721 A1 * | 7/2002 | Nicolas | H04Q 11/0005 | 385/24 |
| 2002/0093707 A1 * | 7/2002 | Katagiri | H04Q 11/0005 | 398/59 |
| 2002/0106143 A1 * | 8/2002 | Doerr | G02B 6/12007 | 385/24 |
| 2002/0110314 A1 * | 8/2002 | Connolly | G02B 6/29382 | 385/24 |
| 2002/0110322 A1 * | 8/2002 | Brun | G02B 6/327 | 385/74 |
| 2002/0118929 A1 * | 8/2002 | Brun | G02B 6/3863 | 385/84 |
| 2002/0126337 A1 * | 9/2002 | Uematsu | H04J 14/0201 | 398/1 |
| 2002/0159117 A1 * | 10/2002 | Nakajima | H04J 14/022 | 398/4 |
| 2002/0196494 A1 * | 12/2002 | McGuire, Jr. | G02B 6/356 | 385/24 |
| 2003/0002104 A1 * | 1/2003 | Caroli | H04J 14/0204 | 398/82 |
| 2003/0026529 A1 * | 2/2003 | Durkin | H04J 14/0213 | 385/24 |
| 2003/0072054 A1 * | 4/2003 | DeCusatis | H04J 14/0221 | 398/79 |
| 2003/0161637 A1 * | 8/2003 | Yamamoto | H04J 14/0206 | 398/115 |
| 2003/0175030 A1 * | 9/2003 | Chen | H04J 14/0212 | 359/489.09 |
| 2003/0210858 A1 * | 11/2003 | Kaneko | G02B 6/12014 | 385/24 |
| 2003/0223751 A1 * | 12/2003 | Shimizu | H04J 14/0221 | 398/79 |
| 2004/0005152 A1 * | 1/2004 | Horachi | H04J 14/0221 | 398/79 |
| 2004/0033076 A1 * | 2/2004 | Song | H04J 14/028 | 398/70 |
| 2004/0037559 A1 * | 2/2004 | Gunning | H04Q 11/0005 | 398/154 |
| 2004/0042796 A1 * | 3/2004 | Con-Carolis | H04J 14/0291 | 398/83 |
| 2004/0109685 A1 * | 6/2004 | Wan | H04J 14/0221 | 398/41 |
| 2004/0130764 A1 * | 7/2004 | Stenger | G02B 6/29383 | 359/892 |
| 2004/0131309 A1 * | 7/2004 | Zhang | G02B 6/29362 | 385/24 |
| 2004/0165891 A1 * | 8/2004 | Kopelovitz | H04J 14/0208 | 398/59 |
| 2004/0207923 A1 * | 10/2004 | Kachru | G02B 6/29383 | 385/24 |
| 2004/0208505 A1 * | 10/2004 | Kinoshita | H04J 14/0213 | 398/19 |
| 2004/0208506 A1 * | 10/2004 | Kinoshita | H04J 14/0227 | 398/19 |
| 2004/0208542 A1 * | 10/2004 | Peddanarappagari | H04J 14/0221 | 398/45 |
| 2004/0208561 A1 * | 10/2004 | Kinoshita | H04J 14/0241 | 398/59 |
| 2004/0208576 A1 * | 10/2004 | Kinoshita | H04J 14/0217 | 398/83 |

(56) References Cited

U.S. PATENT DOCUMENTS

| | | | |
|---|---|---|---|
| 2004/0218926 A1* | 11/2004 | Kim | H04J 14/021 398/83 |
| 2004/0228630 A1* | 11/2004 | Kim | H04J 14/0212 398/83 |
| 2005/0013615 A1* | 1/2005 | Matsuda | H04J 14/0219 398/83 |
| 2005/0036791 A1* | 2/2005 | Gunn, III | H04B 10/5051 398/183 |
| 2005/0053375 A1* | 3/2005 | Yoo | H04Q 11/0005 398/53 |
| 2005/0053377 A1* | 3/2005 | Yoo | H04J 14/0201 398/79 |
| 2005/0084267 A1* | 4/2005 | Fan | H04J 14/0238 398/84 |
| 2005/0129402 A1* | 6/2005 | Kim | G02B 6/124 398/79 |
| 2005/0175346 A1* | 8/2005 | Takeguchi | H04J 14/0212 398/83 |
| 2005/0180751 A1* | 8/2005 | Wood | H04J 14/021 398/83 |
| 2005/0226621 A1* | 10/2005 | Kikuchi | H04J 14/0212 398/83 |
| 2005/0286896 A1* | 12/2005 | Kinoshita | H04J 14/0283 398/83 |
| 2006/0280402 A1* | 12/2006 | Xia | G02B 6/29395 385/24 |
| 2007/0172240 A1* | 7/2007 | Terai | H04J 14/02 398/83 |
| 2007/0223925 A1 | 9/2007 | Ohtani | |
| 2008/0013955 A1* | 1/2008 | Takano | G02B 6/29365 398/85 |
| 2008/0043311 A1* | 2/2008 | Liu | G02B 27/283 359/489.09 |
| 2009/0087182 A1* | 4/2009 | Cush | H04J 14/0246 398/59 |
| 2010/0119232 A1 | 5/2010 | Byun | H04J 14/02 398/83 |
| 2011/0026925 A1* | 2/2011 | Mu | H04J 14/0221 398/79 |
| 2011/0268438 A1* | 11/2011 | Daems | H04B 10/071 398/16 |
| 2014/0161453 A1* | 6/2014 | Onaka | H04B 10/071 359/344 |
| 2015/0334475 A1* | 11/2015 | Chen | G02B 6/2937 398/48 |
| 2016/0097901 A1* | 4/2016 | Lu | H04J 14/0282 385/18 |
| 2016/0164625 A1* | 6/2016 | Gronvall | H04J 14/0282 398/79 |
| 2021/0376922 A1* | 12/2021 | Coetzee | H04B 10/071 |
| 2021/0396933 A1* | 12/2021 | Mosti | G02B 6/4246 |
| 2022/0286221 A1* | 9/2022 | Magri | H04J 14/0257 |
| 2023/0054228 A1* | 2/2023 | Capasso | H04J 14/0209 |

OTHER PUBLICATIONS

Infinera, "Auto-Lambda: Infinera's Solution for Autotuneable DWDM in Access Networks", Application Note, Infinera Corporation, 2018, pp. 1-5.

* cited by examiner $$A^{(c)} = \begin{bmatrix} \lambda_1 & \lambda_2 & \cdots & \lambda_{n-1} & \lambda_0 \\ \lambda_2 & \lambda_3 & \cdots & \lambda_0 & \lambda_1 \\ \vdots & \vdots & \ddots & \vdots & \vdots \\ \lambda_{n-1} & \lambda_0 & \cdots & \lambda_{n-3} & \lambda_{n-2} \\ \lambda_0 & \lambda_1 & \cdots & \lambda_{n-2} & \lambda_{n-1} \end{bmatrix} \begin{matrix} \text{Port 2} \\ \\ \\ \text{Port 1} \end{matrix}$$

Fig. 17

$$A^{(NC)} = \begin{pmatrix} \lambda_0 & \lambda_{-1} & \cdots & \lambda_{-n+2} & \lambda_{-n+1} \\ \lambda_1 & \lambda_0 & \cdots & \lambda_{-n+3} & \lambda_{-n+2} \\ \vdots & \vdots & \ddots & \vdots & \vdots \\ \lambda_{n-2} & \lambda_{n-3} & \cdots & \lambda_0 & \lambda_{-1} \\ \lambda_{n-1} & \lambda_{n-2} & \cdots & \lambda_1 & \lambda_0 \end{pmatrix}$$

Fig. 19

OPTICAL NODE AND OPTICAL TRANSCEIVER FOR AUTO TUNING OF OPERATIONAL WAVELENGTH

TECHNICAL FIELD

The present disclosure relates to an optical node and to an optical transceiver. The present disclosure also relates to methods for operating an optical node and an optical transceiver, a controller for an optical transceiver and a computer program product configured to carry out methods for operating an optical node and an optical transceiver.

BACKGROUND

Mobile traffic bandwidth demand in communication networks has increased dramatically in recent years, and is predicted to continue increasing, in particular with the implementation of 5G mobile networks. In order to accommodate this increasing demand, the optical fronthaul of Radio Access Networks (RANs) is evolving to implement Dense Wavelength Division Multiplexing (DWDM) solutions. DWDM enables more efficient use of existing fiber infrastructure through multi-channel communications. Wavelength tuneable transceivers, capable of operating at a range of frequencies within an operational band, can both simplify and reduce costs associated with supply, inventory, and operation of DWDM fronthaul networks.

On deployment of wavelength tuneable transceivers, a solution to remotely tune the transceivers, enabling the correct two-way communication, is needed. Such tuning should ideally be automatic and require minimal time, so ensuring serviceability.

Automatic wavelength tuning of transceivers is available in the form of bi-directional communication protocols. Such protocols involve a dedicated communication channel that is used to exchange setting information between a master transceiver and a slave transceiver. The dedicated communication channel is either a pilot-tone superimposed on the traffic signal or is part of the frame overhead in a framed protocol. Example automatic wavelength tuning protocols include those set out in the International Telecommunication Union Telecommunication Standard Sector (ITU-T) Recommendation G698.4, the Proprietary Self-Tuning with transceiver-to-transceiver digital optical communication (T2DOC), and proprietary Self-Tuning with sideband communication channel between transceivers.

Each of the above mentioned automatic tuning solutions requires a bi-directional hand-shaking protocol between endpoints. This is typically a relatively slow process, and can take up to 10 minutes to complete. In addition, wavelength tuning cannot be started until the entire End to End (E2E) connection is correctly established. Any fiber mismatch in the E2E connection will cause the tuning protocols discussed above to fail. Troubleshooting such a failure can be extremely challenging, particularly at the remote end of the connection, owing to a lack of feedback concerning the cause of the failure.

SUMMARY

It is an aim of the present disclosure to provide an optical node, an optical transceiver and associated methods and computer readable media which at least partially address one or more of the challenges discussed above.

According to a first aspect of the present disclosure, there is provided an optical node for multiplexing optical signals, the optical node comprising an add port, a common port, an auxiliary port, an optical transfer module and a reflecting element coupled to the auxiliary port. The optical transfer module is configured to couple a signal received on the add port and matching an operational wavelength of the optical node to the common port, and to couple a signal received on the add port and not matching an operational wavelength of the optical node to the auxiliary port. The reflecting element is configured to reflect a signal received on the auxiliary port to the add port. The reflecting element may comprise a mirror.

According to examples of the present disclosure, the optical transfer module may be configured to couple any signal received on the add port and not matching an operational wavelength of the optical node to the auxiliary port.

According to examples of the present disclosure, the auxiliary port may be internal to the optical node and, in some examples, may be internal to the optical transfer module.

According to examples of the present disclosure, the optical transfer module may comprise an optical filtering element, and the optical filtering element may comprises an add port coupled to the add port of the optical node, a common port coupled to the common port of the optical node, and a filter layer. The filter layer may be configured to couple a signal received on the add port of the optical filtering element and matching a pass-band of the filter layer to the common port of the optical filtering element, and to couple any signal received on the add port of the optical filtering element and not matching a pass-band of the filter layer to the auxiliary port of the optical node. The operational wavelength of the optical node may comprise a wavelength matching a pass band of the filter layer.

According to examples of the present disclosure, the optical filtering element may comprise a Thin Film Filter (TFF).

According to examples of the present disclosure, the common port of the optical filtering element may be coupled to the common port of the optical node via other elements, for example other optical filtering elements as set out below.

According to examples of the present disclosure, the optical filtering element may further comprise an express port that may be coupled to the common port of the optical filtering element.

According to examples of the present disclosure, the optical node may further comprise a plurality of add ports and a corresponding plurality of optical filtering elements, auxiliary ports and reflecting elements coupled to the auxiliary ports, wherein each add port of the optical node is coupled to an add port of a corresponding optical filtering element. The filter layer of each optical filtering element may be configured to couple any signal received on the add port of the optical filtering element and not matching a pass-band of the filter layer to a respective auxiliary port of the optical node. Each reflecting element may be configured to reflect a signal received on its coupled auxiliary port to the add port of the optical node to which the optical filtering element from which the signal on its coupled auxiliary port was received is coupled. In such examples, the optical node may comprise a plurality of operational frequencies, each operational frequency corresponding to the pass-band of the filter layer of a respective one of the optical filtering elements.

According to examples of the present disclosure, each optical filtering element may further comprise an express port that is coupled to its common port, and the optical filtering elements may be connected in series, such that a common port of a first optical filtering element is coupled to an express port of a second optical filtering element.

According to examples of the present disclosure, the common port of a last optical filtering element may be coupled to the common port of the optical node.

According to examples of the present disclosure, the optical node may also be for demultiplexing optical signals, and the optical node may further comprise a drop port and a corresponding optical filtering element. The corresponding optical filtering element may comprises an express port, a common port, a drop port coupled to the drop port of the optical node, and a filter layer. The filter layer may be configured to couple a signal received on the express port and matching its pass-band to the drop port, and to couple a signal received on the express port and not matching its pass band to the common port.

According to examples of the present disclosure, the optical node may comprise a plurality of drop ports and a corresponding plurality of optical filtering elements, which may be connected in series such that a common port of a first optical filtering element is coupled to an express port of a second optical filtering element and a common port of a last optical filtering element is coupled to the common port of the optical node.

According to examples of the present disclosure, the optical transfer module may be configured to couple a signal having a predetermined wavelength that is received on the add port and not matching an operational wavelength of the optical node to the auxiliary port.

According to examples of the present disclosure, the predetermined wavelength may comprise a wavelength that is adjacent to the operational wavelength of the optical node in a candidate set of wavelengths.

According to examples of the present disclosure, the optical node may comprise an Arrayed Waveguide Grating (AWG), and the optical transfer module may comprise first and second planar regions and a plurality of waveguides coupling the planar regions. According to such examples, the optical transfer module may be configured to couple a signal received on the add port of the AWG and having a first wavelength to the common port of the AWG, and to couple a signal received on the add port of the AWG and having a second wavelength to the auxiliary port of the AWG. The first wavelength may comprise the operational wavelength of the AWG and the second wavelength may comprise a wavelength that is adjacent to the operational wavelength of the AWG according to a transfer function of the AWG.

According to examples of the present disclosure, adjacent may refer to a specific relationship to the operational wavelength, that is adjacent may comprise the wavelength that precedes the operational wavelength in an ordered sequence according to the transfer function.

According to examples of the present disclosure, a transfer function of the AWG may define a connectivity between input and output ports of the AWG according to the wavelength of a signal input on an input port. According to examples of the present disclosure, the add port of the AWG may comprise an input port and the common port and the auxiliary port of the AWG may comprise output ports of the AWG.

According to examples of the present disclosure, the transfer function may be expressed as a connection matrix in which the entries of the matrix comprise wavelengths that connect a specific input port to a specific output port.

According to examples of the present disclosure, the AWG may comprise a plurality of add ports and a corresponding plurality of operational wavelengths, and the optical transfer module may be configured to couple signals received on the add ports to the common port and the auxiliary port of the AWG such that, for each of the add ports, a signal received on the add port and having a wavelength matching the operational wavelength for that add port is coupled to the common port of the AWG, and a signal received on the add port and having a wavelength that is adjacent to the operational wavelength for that add port according to a transfer function of the AWG is coupled to the auxiliary port of the AWG.

According to another aspect of the present disclosure, there is provided an optical node for multiplexing optical signals, the optical node comprising an add port, a common port, an auxiliary port, an optical transfer module, and a monitoring element configured to monitor optical signal power of an optical signal received on the auxiliary port. The optical transfer module may be configured to couple a signal received on the add port and matching an operational wavelength of the optical node to the common port, and to couple a signal received on the add port and not matching an operational wavelength of the optical node to the auxiliary port.

According to examples of the present disclosure, the optical node may comprise an AWG and the optical transfer module may comprise first and second planar regions and a plurality of waveguides coupling the planar regions. According to such examples, the AWG may comprise a plurality of add ports and a corresponding plurality of operational wavelengths, and the optical transfer module may be configured to couple signals received on the add ports to the common port and the auxiliary port of the AWG such that, for each of the add ports, a signal received on the add port and having a wavelength matching the operational wavelength for that add port is coupled to the common port of the AWG, and a signal received on the add port and having a wavelength that is adjacent to the operational wavelength for that add port according to a transfer function of the AWG is coupled to the auxiliary port of the AWG.

According to another aspect of the present disclosure, there is provided an optical transceiver comprising a tuneable laser configured to generate an optical signal, a port for transmitting the generated optical signal and operable to receive an optical signal, and a received signal monitoring element configured to monitor optical signal power of an optical signal received on the port.

According to examples of the present disclosure, the tuneable laser may be configured to generate an optical signal at a plurality of different wavelengths.

According to examples of the present disclosure, the received signal monitoring element may comprise a photodiode.

According to examples of the present disclosure, the optical transceiver may also comprise a modulator configured to modulate the optical signal generated by the tuneable laser, and an outgoing signal monitoring element configured to monitor signal power of the transmitted generated optical signal. The outgoing signal monitoring element may comprise a photodiode.

According to another aspect of the present disclosure, there is provided a method for operating an optical transceiver, wherein the optical transceiver comprises a tuneable laser configured to generate an optical signal, a port for transmitting the generated optical signal and operable to receive an optical signal, and a received signal monitoring element configured to monitor optical signal power of an optical signal received on the port. The method, performed by a controller of the optical transceiver, comprises causing the tuneable laser to scan over wavelengths from a candidate set of transmission wavelengths, monitoring received optical signal power on the transmission port, and identifying a transmission wavelength at which a power transition of the monitored received optical signal power takes place. The method further comprises selecting an operational wavelength as a function of the identified transmission wavelength and causing the tuneable laser to generate an optical signal at the identified transmission wavelength.

According to examples of the present disclosure, a power transition may correspond to a transition from a detected presence to a detected absence of a received signal on the transmission port, or from a detected absence to a detected presence of a received signal on the transmission port.

According to examples of the present disclosure, identifying a transmission wavelength at which a power transition of the monitored received optical signal power takes place may comprise identifying a transmission wavelength at which the monitored received optical signal power falls below a threshold value associated with a minimum predicted signal power of an optical signal received on the transmission port. Selecting an operational wavelength as a function of the identified transmission wavelength may comprise selecting as the operation wavelength the identified transmission wavelength. According to examples of the present disclosure, identifying a transmission wavelength at which a power transition of the monitored received optical signal power takes place may comprise identifying a transmission wavelength at which the monitored received optical signal power rises above a threshold value associated with a minimum predicted signal power of an optical signal received on the transmission port. Selecting an operational wavelength as a function of the identified transmission wavelength may comprise selecting as the operation wavelength a wavelength that is adjacent in a candidate set of transmission wavelengths to the identified transmission wavelength.

According to examples of the present disclosure, selecting as the operational wavelength a wavelength that is adjacent in a candidate set of transmission wavelengths to the identified transmission wavelength may comprises selecting a wavelength that is adjacent to the identified wavelength according to a transfer function of an optical node according to any one or more of the preceding aspects or examples of the present disclosure and to which the port of the optical transceiver is connected.

According to examples of the present disclosure, the threshold value may correspond to a minimum predicted signal power of an optical signal reflected by an optical node according to any one or more of the preceding aspects or examples of the present disclosure and received at the port of the optical transceiver.

According to examples of the present disclosure, the method may further comprise obtaining a candidate set of transmission wavelengths. Obtaining a candidate set of transmission wavelengths may comprises at least one of retrieving the candidate set of transmission wavelengths from a memory of the optical transceiver, or receiving the candidate set of transmission wavelengths from a component coupled to the optical transceiver.

According to examples of the present disclosure, the component coupled to the optical transceiver may for example comprise a hosting board or other component configured with system information for a system in which the optical transceiver is deployed. The candidate set of transmission wavelengths may thus comprise those wavelengths used by a multiplexing optical node with which the transceiver will be communicating.

According to examples of the present disclosure, the candidate set of transmission wavelengths may comprise Wavelength Division Multiplexing (WDM) wavelengths and may comprise Dense Wavelength Division Multiplexing (DWDM) wavelengths.

According to examples of the present disclosure, scanning the tuneable laser over wavelengths from a candidate set of transmission wavelengths may comprise generating an initial optical signal at a seed wavelength, and modifying the wavelength of the generated optical signal according to a set of scanning parameters.

According to examples of the present disclosure, the seed wavelength may be configured in the optical transceiver or set by another component such as a hosting board. The scanning parameters may include a step size for wavelength modification during scanning. The step size may fir example correspond to a channel separation.

According to examples of the present disclosure, the method may further comprise communicating the selected operational wavelength to an upstream optical node. According to examples of the present disclosure, the upstream optical node may be hosted at a main site, for example if the transceiver is at a remote site. The upstream optical node may be an end point such as a transceiver at the main site. The identified wavelength may be communicated to the optical node on an in-band frame overhead or pilot tone.

According to another aspect of the present disclosure, there is provided a method for operating an optical transceiver, wherein the optical transceiver comprises a tuneable laser configured to generate an optical signal and a port for transmitting the generated optical signal and operable to receive an optical signal. The method, performed by a controller of the optical transceiver, comprises causing the tuneable laser to scan over wavelengths from a candidate set of transmission wavelengths, receiving a control signal communicating an operational wavelength for the transceiver, and causing the tuneable laser to generate an optical signal at the selected operational wavelength.

According to another aspect of the present disclosure, there is provided a method for operating an optical node according to a preceding aspect or example of the present disclosure. The method comprises receiving, at the add port of the optical node, a plurality of optical signals transmitted by an optical transceiver and monitoring, at the monitoring element of the optical node, received optical signal power on the auxiliary port of the optical node. The method further comprises identifying a transmission wavelength at which a power transition of the monitored received optical signal power takes place, selecting an operational wavelength as a function of the identified transmission wavelength, and communicating the selected operational wavelength to the optical transceiver.

According to examples of the present disclosure, the identifying and selection steps of the above method may comprise features as set out above with respect to the performance of these steps as part of a method for operating an optical transceiver.

According to another aspect of the present disclosure, there is provided a computer program comprising instructions which, when executed on at least one processor, cause the at least one processor to carry out a method according to any one of the preceding aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

According to another aspect of the present disclosure, there is provided a system for optical transmission, the system comprising an optical node according to any one of the preceding aspects or examples of the present disclosure, and an optical transceiver according to any one of the preceding aspects or examples of the present disclosure, wherein the optical transceiver is coupled to the optical node via an optical fiber.

According to examples of the present disclosure, the optical transceiver may be configured to carry out a method according to any one of the preceding aspects or examples of the present disclosure. According to examples of the present disclosure, the optical node may be configured to carry out a method according to any one of the preceding aspects or examples of the present disclosure.

According to another aspect of the present disclosure, there is provided a controller for an optical transceiver, wherein the optical transceiver comprises a tuneable laser configured to generate an optical signal, a port for transmitting the generated optical signal, and a received signal monitoring element configured to monitor optical signal power of an optical signal received on the port. The controller comprises a processing circuitry configured to cause the optical transceiver to: cause the tuneable laser to scan over wavelengths from a candidate set of transmission wavelengths, monitor received optical signal power on the transmission port, identify a transmission wavelength at which a power transition of the monitored received optical signal power takes place, select an operational wavelength as a function of the identified transmission wavelength, and cause the tuneable laser to generate an optical signal at the selected operational wavelength.

According to examples of the present disclosure, the processing circuitry may be further configured to cause the optical transceiver to perform a method according to any one of the preceding aspects or examples of the present disclosure.

According to another aspect of the present disclosure, there is provided a controller for an optical transceiver, wherein the optical transceiver comprises a tuneable laser configured to generate an optical signal, a port for transmitting the generated optical signal, and a received signal monitoring element configured to monitor optical signal power of an optical signal received on the port. The controller is adapted to cause the tuneable laser to scan over wavelengths from a candidate set of transmission wavelengths, monitor received optical signal power on the transmission port, identify a transmission wavelength at which the monitored received optical signal power falls below a threshold value, and cause the tuneable laser to generate an optical signal at the identified transmission wavelength.

According to examples of the present disclosure, the controller may be further adapted to perform a method according to any one of the preceding aspects or examples of the present disclosure.

According to another aspect of the present disclosure, there is provided a controller for an optical transceiver, wherein the optical transceiver comprises a tuneable laser configured to generate an optical signal, and a port for transmitting the generated optical signal and operable to receive an optical signal. The controller comprises processing circuitry configured to cause the optical transceiver to: cause the tuneable laser to scan over wavelengths from a candidate set of transmission wavelengths, receive a control signal communicating an operational wavelength for the transceiver, and cause the tuneable laser to generate an optical signal at the selected operational wavelength.

According to another aspect of the present disclosure, there is provided a controller for an optical node, wherein the optical node comprises an add port, a common port, an auxiliary port, an optical transfer module, and a monitoring element configured to monitor optical signal power of an optical signal received on the auxiliary port, wherein the optical transfer module is configured to couple a signal received on the add port and matching an operational wavelength of the optical node to the common port, and to couple a signal received on the add port and not matching an operational wavelength of the optical node to the auxiliary port. The controller comprises processing circuitry configured to cause the optical node to receive, at the add port of the optical node, a plurality of optical signals transmitted by an optical transceiver and to monitor, at the monitoring element of the optical node, received optical signal power on the auxiliary port of the optical node. The processing circuitry is further configured to identify a transmission wavelength at which a power transition of the monitored received optical signal power takes place, select an operational wavelength as a function of the identified transmission wavelength, and communicate the selected operational wavelength to the optical transceiver.

According to another aspect of the present disclosure, there is provided a method for verifying a connection between a transceiver and a first optical node, wherein the first optical node is configured to transmit optical signals between the transceiver and a second optical node, wherein the first optical node comprises a plurality of bidirectional channel ports to which a transceiver may be coupled, and wherein a bidirectional channel port comprises an add port and a drop port. The method, performed by a controller of the first optical node, comprises detecting optical signals at add and drop ports of the bidirectional channel ports of the first optical node, and identifying that the transceiver is misconnected if the presence of an optical signal is detected on the add port and not on the drop port of the bidirectional channel port to which the transceiver is connected.

According to examples of the present disclosure, the method may further comprise identifying a bidirectional channel port on the first optical node at which the presence of an optical signal is detected on the drop port and not on the add port of the bidirectional channel port, and initiating transfer of the transceiver to be connected to the identified bidirectional channel port.

According to examples of the present disclosure, the second optical node may comprise an optical node according to any one of the preceding aspects or examples of the present disclosure.

According to examples of the present disclosure, the second optical node may be connected to at least one optical transceiver according to any one of the preceding aspects or examples of the present disclosure.

According to examples of the present disclosure, the optical transceiver to which the second optical node is connected may be configured to carry out a method according to any one of the preceding aspects or examples of the present disclosure.

BRIEF DESCRIPTION OF THE DRAWINGS

For a better understanding of the present disclosure, and to show more clearly how it may be carried into effect, reference will now be made, by way of example, to the following drawings, in which:

FIG. 17 illustrates a transfer function of a cyclic AWG multiplexer;

FIG. 19 illustrates a transfer function of a non-cyclic AWG multiplexer;

DETAILED DESCRIPTION

Examples of the present disclosure propose an auto tuning solution according to which direct optical feedback is provided from a multiplexer to a transceiver. This feedback may be passive, and allows for self-contained local wavelength tuning between the two components. As such, there is no requirement for E2E handshaking, i.e. requiring optical communication between two end points of a communication, such as a remote site node and a main site node. In some examples, the auto tuning is carried out within a single node or site. This local auto tuning is considerably faster than E2E protocols, and also simplifies troubleshooting of fiber misconnection, as wavelengths will be correctly coupled to a fiber link from a remote site to a main site even before E2E connectivity is established. An auto tuning solution according to examples of the present disclosure can be implemented with minimal component modification according to different examples. In one example, a monitoring element is introduced to a transceiver for monitoring passive feedback, and a reflective element is coupled to an auxiliary port in or of a multiplexer. In operation, a transceiver may scan different wavelengths and receive feedback from the reflective element added to the multiplexer, which feedback is detected by the new monitoring element. The correct wavelength for ongoing communication with the multiplexer may be determined on the basis of the wavelength at which a power transition occurs in the feedback signal. This power transition may arise from passive feedback becoming substantially absent owing to correct coupling with the bandpass response of a filter based multiplexer, or from passive feedback becoming substantially present owing to an input wavelength having a known relationship (such as an adjacency relationship) to the operational wavelength of an AWG based multiplexer being input to the multiplexer.

Figure 1:
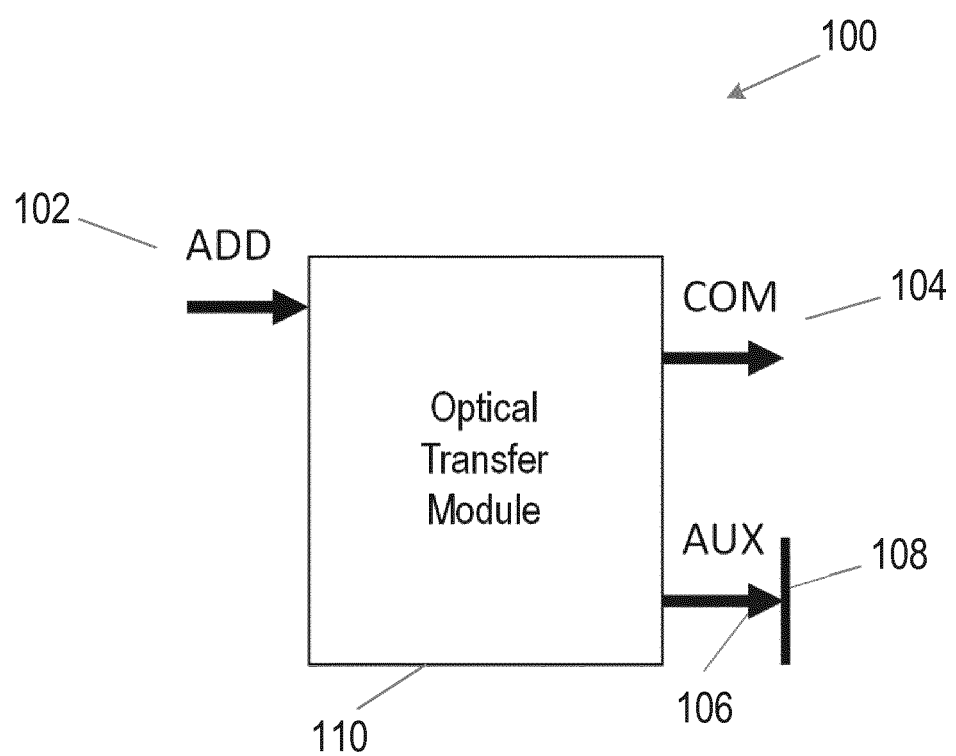
FIG. 1 is a block diagram illustrating an optical node.

FIG. 1 is a block diagram illustrating an optical node 100 according to a first aspect of the present disclosure. The optical node 100 may for example comprise a multiplexer (Mux) or a multiplexer/demultiplexer (Mux/Demux). Referring to FIG. 1, the optical node 100 comprises an add port 102, a common port 104, an auxiliary port 106, an optical transfer module 110 and a reflecting element 108 coupled to the auxiliary port 108. The optical transfer module is configured to couple a signal received on the add port 102 and matching an operational wavelength of the optical node 100 to the common port 104, and to couple a signal received on the add port 102 and not matching an operational wavelength of the optical node to the auxiliary port 106. The operational wavelength may also be referred to as the correct wavelength or intended wavelength. The reflecting element 108 is configured to reflect a signal received on the auxiliary port 106 to the add port 102. According to different examples of the optical node 100, the optical transfer module 110 may comprise an optical filtering element, such as a Thin Film Filter (TFF), or may comprise the planar regions and coupling waveguides of an Arrayed Waveguide Grating (AWG). Optical nodes according to each of these different examples are described below, with reference to the accompanying figures.

Figure 2:
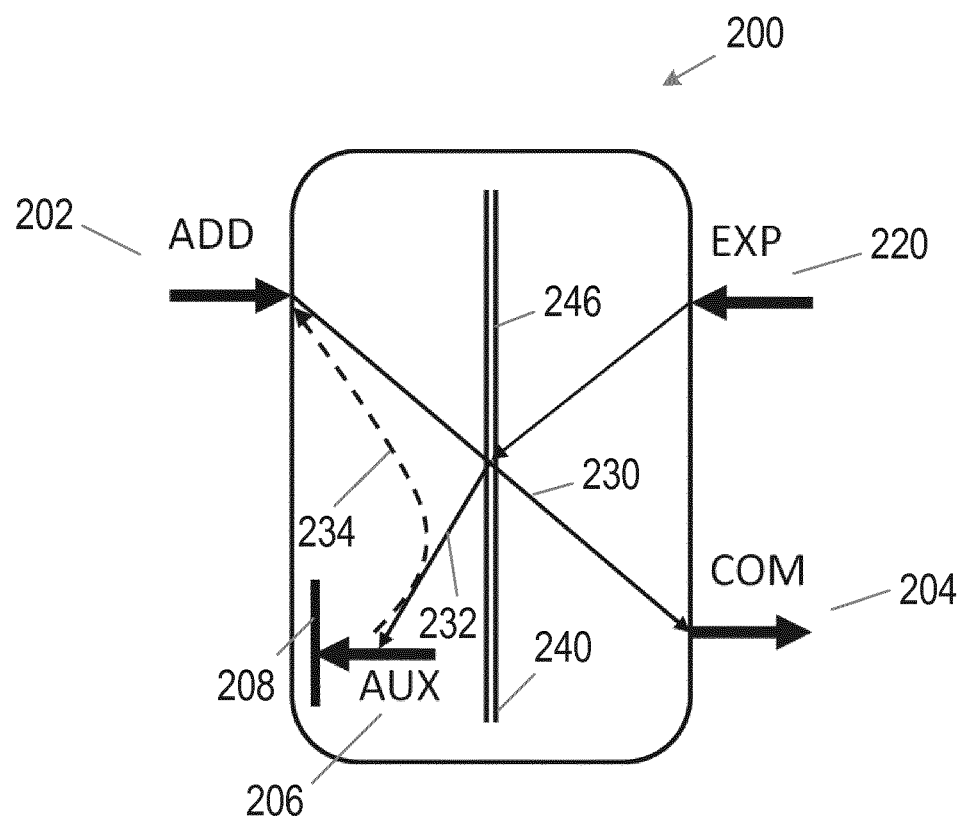
FIG. 2 is a block diagram illustrating another example of optical node.

FIG. 2 is a block diagram illustrating an optical node 200 according to a first example of the present disclosure. The optical node 200 may for example comprise a multiplexer (Mux) or a multiplexer/demultiplexer (Mux/Demux). Referring to FIG. 2, the optical node 200 comprises an add port 202, a common port 204, an auxiliary port 206, an express port 220, an optical transfer module in the form of an optical filtering element 240, and a reflecting element 208 in the form of a mirror. As discussed in further detail below with reference to FIG. 3, the optical filtering element 240 comprises a filter layer 246. The filter layer 246 is configured to couple a signal 230 received on the add port 202 of the optical node 200 and matching a pass-band of the filter layer 246 to the common port 204 of the optical node 200, and to reflect a signal 232 received on the add port 202 of the optical node 200 and not matching a pass-band of the filter layer 246 to the auxiliary port 206 and coupled reflecting element 208. The reflecting element 208 is configured to reflect a signal received on the auxiliary port 206, as not matching a passband of the filter layer 246, back to the add port 202. As illustrated in FIG. 2, such a signal may be reflected back to the add port 202 via the filter layer 246. The express port 220 of the node 200 is coupled to the common port 204 such that express channels are reflected to the common port 204 via the filtering element 240. As such, the common port 204 comprises the wavelength(s) of the express port 220 and the matching (i.e. correct) wavelength (s) of the add port 202.

Figure 3:
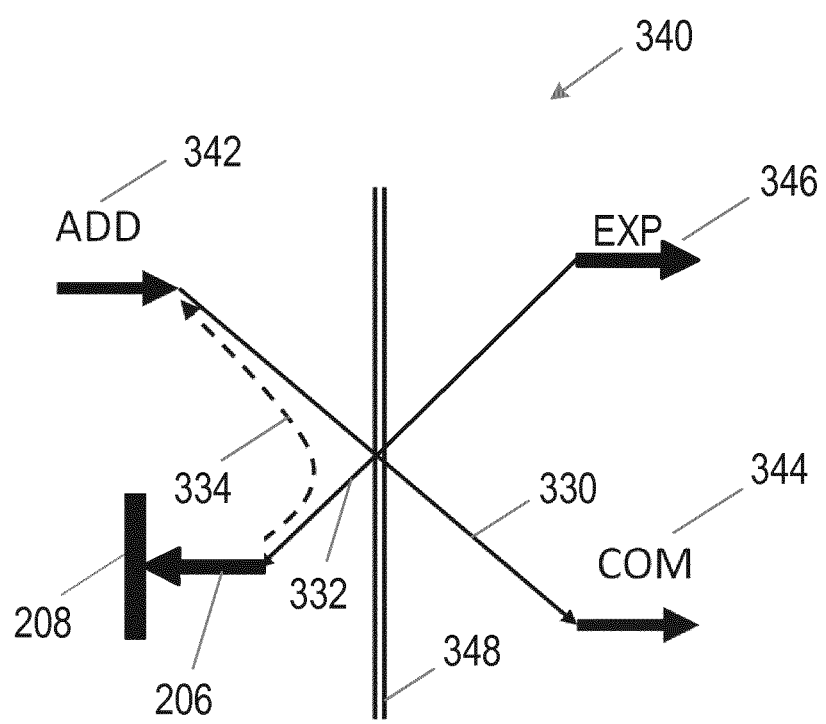
FIG. 3 is a block diagram illustrating an optical filtering element.

The optical filtering element 246 may for example be a Thin Film Filter element, as often used in optical multiplexer nodes. FIG. 3 is a block diagram illustrating an optical filtering element 340 according to examples of the present disclosure, which may be incorporated into an optical node such as the optical node 200 as the optical transfer module of the optical node. The optical filtering element 340 is a 3-port device comprising an add port 342, an express port 346, a common port 344 and a filtering layer 348. In the illustrated example, the auxiliary port 206 of an optical node 200 in which the optical filtering element 340 is incorporated is actually internal to the optical filtering element, and comprises the "internal" fourth port of the optical filtering element. This "internal" fourth port is not used in existing optical filtering elements.

The express port 346 of the optical filtering element 340 is coupled to the common port 344 such that express channels are reflected to the common port 344 via the filtering element 348. The filtering layer 348 couples signals received on the add port 342 and matching the pass band of the filter layer 348 to the common port 344. Thus, the device (e.g. optical transfer module) is configured to output, at the common port, the wavelengths received on the express port and the one or more operational wavelengths received on the add port. The common port provides for wavelengths to be added to the express (or pass-through) wavelengths received at the device, e.g. as part of an add-drop multiplexer. In this way, the device multiplexes the optical wavelengths on the express port with the operational optical wavelengths on the add port. Signals received on the add port 342 and not matching the pass band of the filter layer 346 are reflected back to the "internal" fourth port, which serves as the auxiliary port 206 in the present example. The auxiliary port is not used, monitored or required for multiplexing in a prior art multiplexer when the wavelength at the add port is assumed to be correct, i.e. at the operational wavelength. Examples of the present disclosure in which the optical transfer module comprises an optical filtering element thus exploit this "internal" fourth port that corresponds to the reflection of the add signal when it doesn't match the pass-band response of the filter layer. This reflection is coupled to an integrated mirror 208. As illustrated by arrow 330, when the optical wavelength coupled with the add port 342 is the correct wavelength for the filter layer 346, no significant reflection is present at the add port 342 (apart from the Optical return Loss (ORL) of the common port 344). As illustrated by arrow 332, when the wavelength coupled to the add port 342 is not the correct wavelength, the light is reflected by the filter layer 346 to the auxiliary port 206 and coupled mirror 208. As illustrated by arrow 334, this reflected light is in turn reflected by a thin film on the mirror 208 and sent back to the add port 342 with negligible loss.

It will be appreciated that in order to incorporate the optical filtering element 340 into the node 200, the add port 342 of the optical filtering element may be coupled to the add port 202 of the optical node 200, the common port 344 of the optical filtering element may be coupled to the common port 204 of the optical node 200, and the express port 346 of the optical filtering element may be coupled to the express port 220 of the optical node 200. The common port 344 and express port 346 may be connected to the common and express ports 204, 220 of the optical node 200 via one or more other elements, such as other optical filtering elements, as discussed in further detail below. In will also be appreciated that the pass-band of the filter layer 348 of the optical filtering element effectively defines the operational wavelength of the optical node in which it is incorporated.

Figure 4:
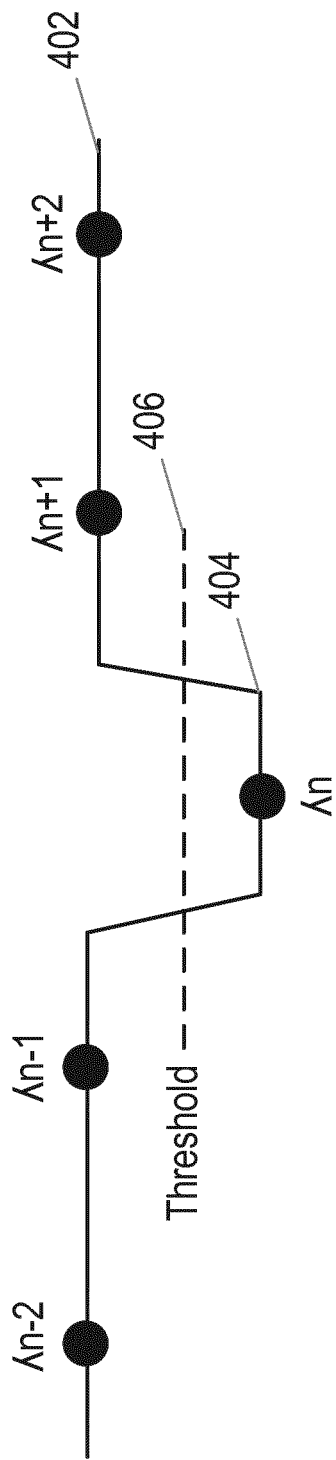
FIG. 4 illustrates a signal power of a reflected signal at an optical filtering element.

FIG. 4 illustrates a signal power of a reflected signal at the add port 342 of an optical filtering element for different wavelengths of signal received at the add port 342. This reflected signal may be detected by a monitoring element in a transceiver as passive feedback, as discussed below. Referring to FIG. 4, a transceiver may scan across all (viable) transmission wavelengths and detect the reflected power back from the add port of the Mux to which it is transmitting. At wavelengths λn−2 and λn−1, the reflected signal power is at a relatively high level 402. However, at transmission wavelength λn, the reflected signal power drops below a threshold level 406 to a relatively low level 404. At wavelength λn+1, the reflected signal power has returned to the relatively high level 402, above the threshold level 406. The transition from the higher level 402 to the lower level 404 represents a power transition of the reflected signal power. In FIG. 4, λn is the correct transmission wavelength, as it is the wavelength at which the reflected signal power received from the add port falls below the threshold value. This wavelength may therefore be selected and set by the transceiver as the auto tuned operational transmission wavelength for communication with the Mux. Even in a situation in which the optical common port of the Mux is not terminated or connected to a fiber, the reflected power at the correct transmission wavelength is about 15 dB lower than for the wrong wavelengths, so ensuring reliable detection of the correct wavelength.

Figure 5:
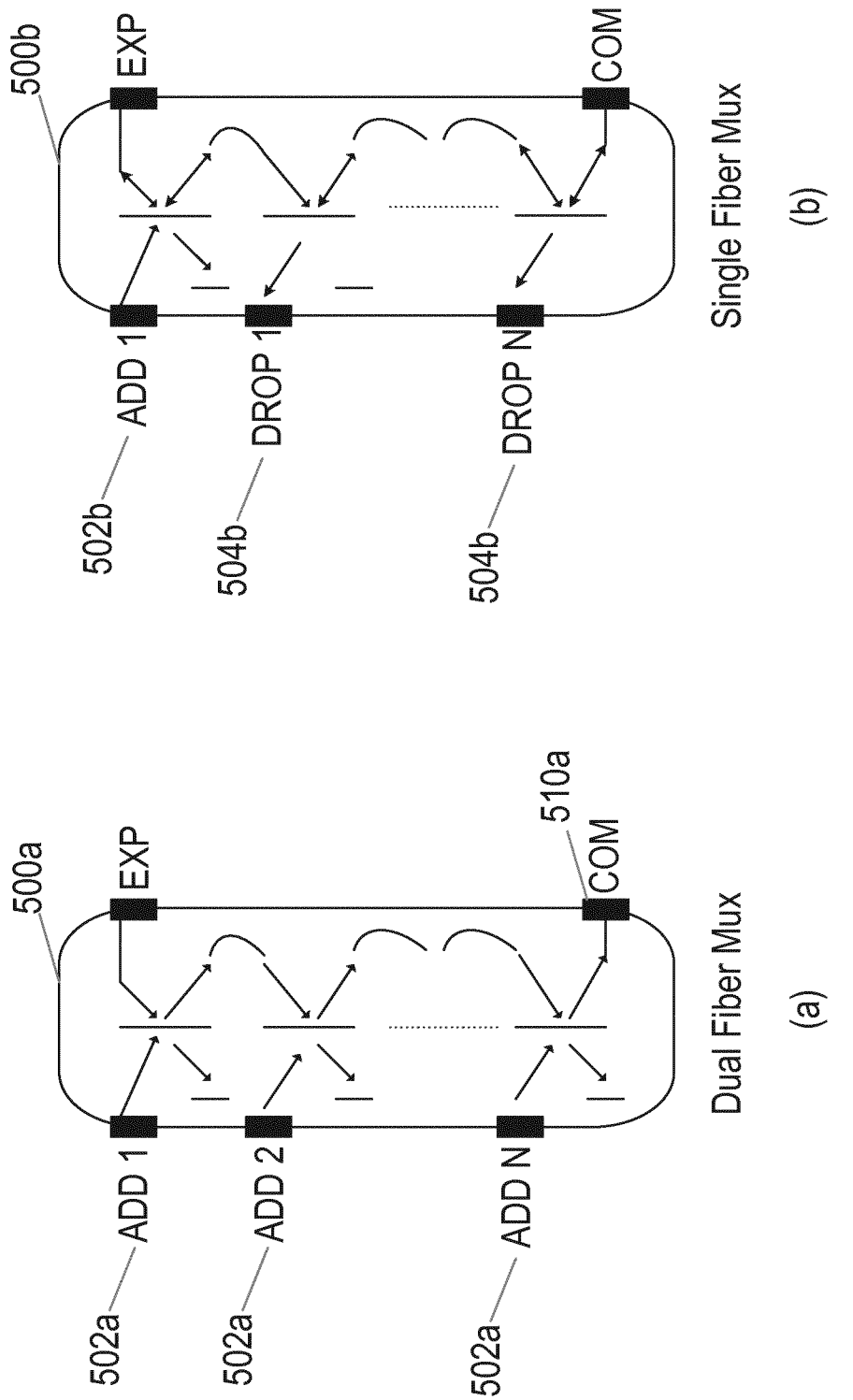
FIGS. 5a and 5b illustrate multi-port optical nodes.

In a multi-port optical Mux/Demux a plurality of optical filtering elements are chained together. FIG. 5a illustrates a multi-port Mux 500a for Dual Fiber Working comprising a plurality of add ports 502a and a corresponding plurality of optical filtering elements, such as the optical filtering element 340, auxiliary ports and reflecting elements coupled to the auxiliary ports. As illustrated in FIG. 5a, each add port 502a of the Mux 500a is coupled to an add port of a corresponding optical filtering element. The optical filtering elements are connected in series, such that a common port of a first optical filtering element is coupled to an express port of a second optical filtering element, with the common port of a last optical filtering element coupled to the common port 510a of the Mux. The multi-port Mux 500a is thus operable to facilitate auto tuning with each transceiver that is connected to one of its add ports, each transceiver being tuned to a different operational frequency of the Mux, corresponding to the pass band of the filter layer of the optical filtering element to which the respective add port is connected. Although the illustrated multiplexer is for Dual Fiber Working, in the case of Bidirectional Transceivers and Single Fiber Working (SFW), the design of the Mux 500a may be used for the add ports of a Mux/Demux.

FIG. 5b illustrates a multi-port Mux/Demux for Single Fiber Working (SFW). As illustrated in FIG. 5b, only the optical filtering element connected to the add port 502b is combined with an additional reflecting element at the "internal" fourth auxiliary port as discussed above. The optical filtering elements for the drop ports 504b comprise standard 3 port optical filtering elements, in which a filter layer is configured to couple a signal received on the express port and matching its pass-band to the drop port, and to couple a signal received on the express port and not matching its pass band to the common port. As illustrated, the Mux/Demux 500b may comprise a plurality of drop ports 504b and a corresponding plurality of optical filtering elements, which may be connected in series such that a common port of a first optical filtering element is coupled to an express port of a second optical filtering element and the common port of a last optical filtering element is coupled to the common port of the Mux/Demux 500b.

Figure 6:
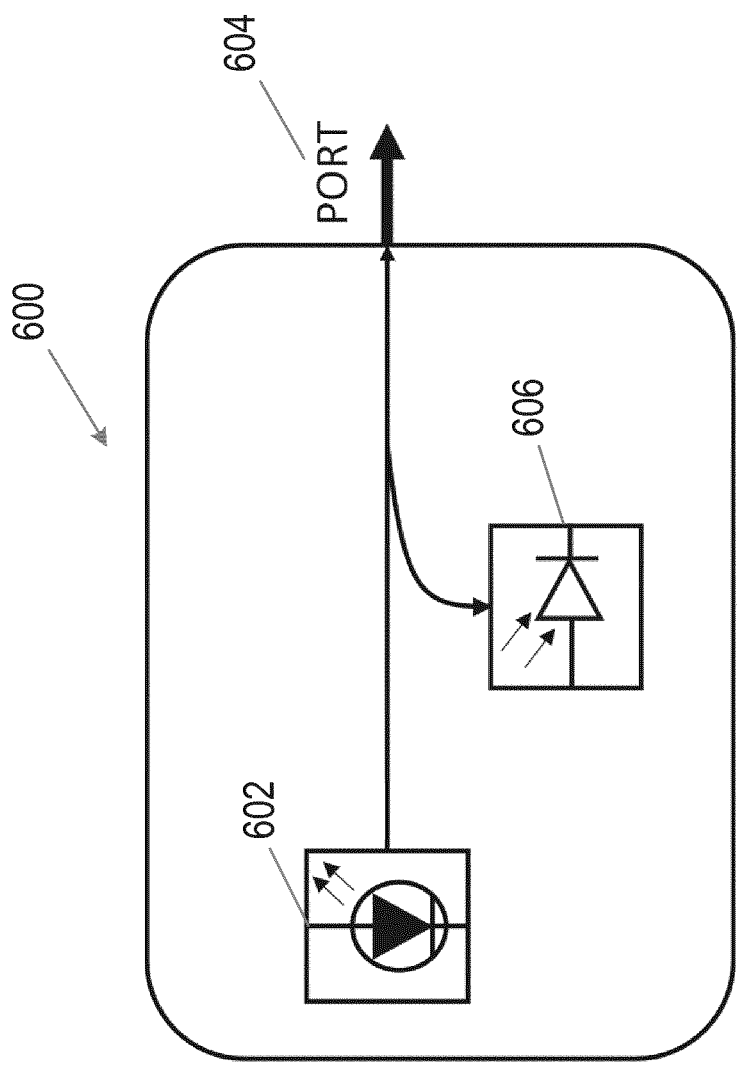
FIG. 6 is a block diagram illustrating an optical transceiver.

FIG. 6 is a block diagram illustrating an optical transceiver 600 according to an aspect of the present disclosure. Referring to FIG. 6, the optical transceiver 600 comprises a tuneable laser 602 configured to generate an optical signal, a transmission port 604 for transmitting the generated optical signal and operable to receive an optical signal, and a received signal monitoring element 606 configured to monitor optical signal power of an optical signal received on the port 604. The monitoring element 606 is able to detect the signal power of a reflected signal received on the transceiver port, enabling the transceiver to detect a change in reflected signal power and so identify the correct transmission wavelength for its deployment.

Figure 7:
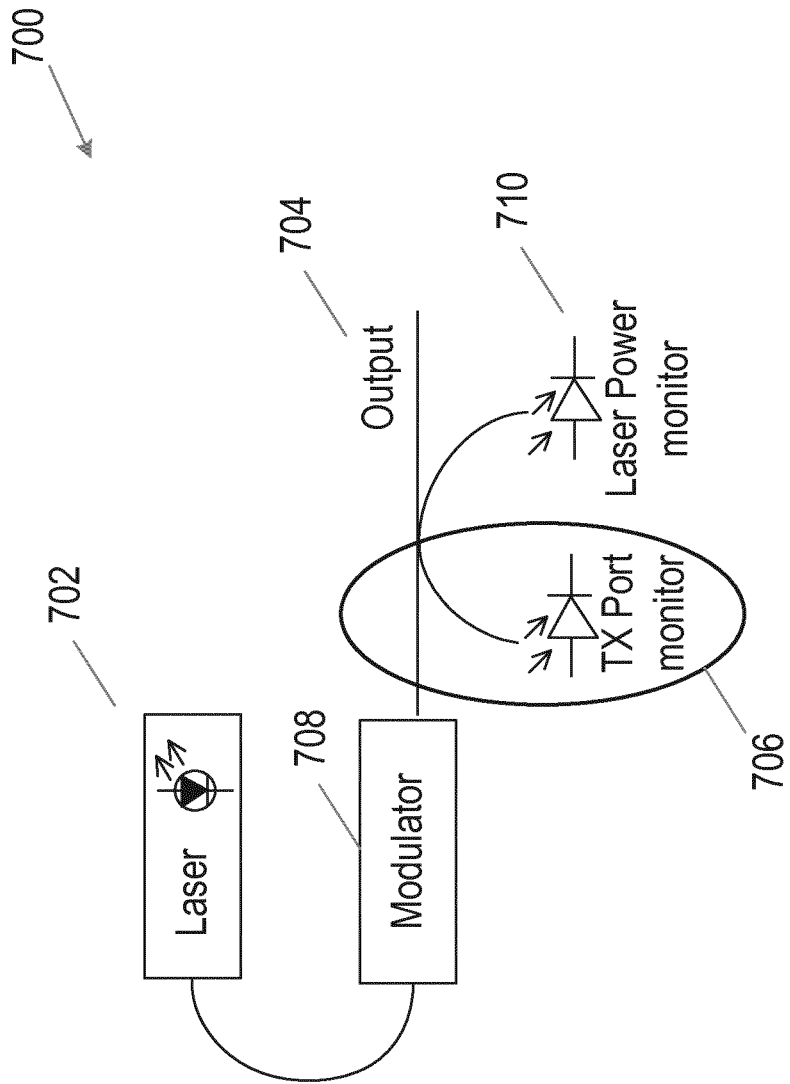
FIG. 7 illustrates another example of optical transceiver.

FIG. 7 illustrates another example of optical transceiver 700 in accordance with the present disclosure. The optical transceiver 700 comprises a tuneable laser 702 configured to generate an optical signal, and a modulator 708 configured to modulate the optical signal generated by the tuneable laser. The transceiver 700 also comprises a transmission port 704 for transmitting the generated optical signal and an outgoing signal monitoring element 710 configured to monitor signal power of the transmitted generated optical signal. The outgoing signal monitoring element 710 may comprise a photodiode. The port 704 is also operable to receive an optical signal, and the transceiver 700 comprises a received signal monitoring element 706 configured to monitor optical signal power of an optical signal received on the port 704. The received signal monitoring element may also comprise a photodiode. The photodiode 706 may be identical to the photodiode 710, but coupled to the opposite propagation direction to the photodiode 710. It will be appreciated that the photodiode 706 may therefore be added to the transceiver during manufacturing at negligible additional cost. The optical transceiver 600,700 of any example may be in the same node or separate node to the multiplexer 200 of any example. In some aspects, the transmission port 605,704 is optically connected to the add port of the multiplexer of any examples. The optical connection between the transceiver and multiplexer is a part only of the end-to-end optical connection required, and is not the whole transmission length.

Figure 8:
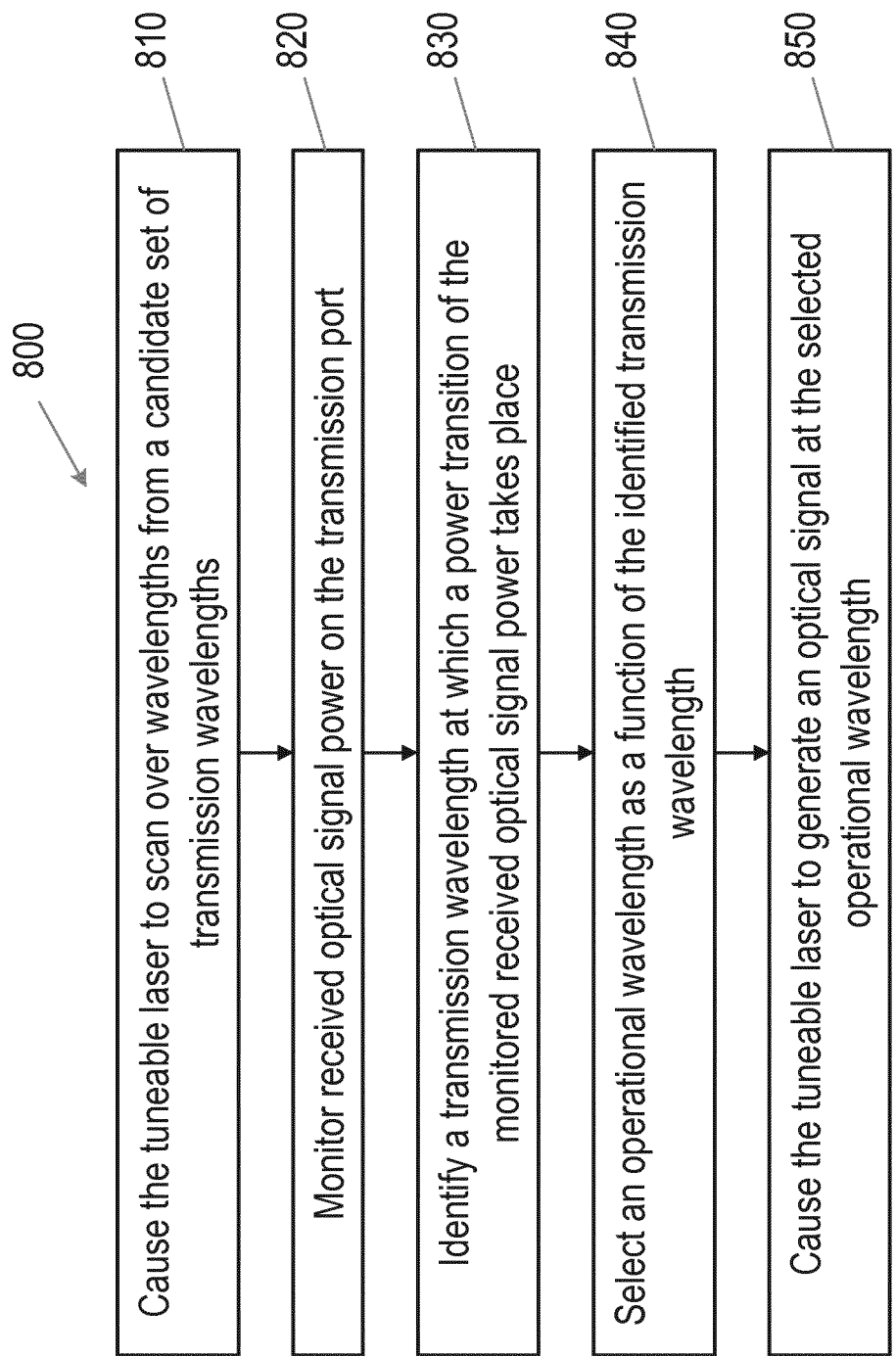
FIG. 8 is a flow chart illustrating process steps in a method for operating an optical transceiver.

FIG. 8 is a flow chart illustrating process steps in a method 800 for operating an optical transceiver, such as the optical transceiver 600 or 700 described above. The method is performed by a controller of the optical transceiver and comprises, in a first step 810, causing the tuneable laser to scan over wavelengths from a candidate set of transmission wavelengths. In step 820, the controller monitors received optical signal power on the transmission port and, in step 830, the controller identifies a transmission wavelength at which a power transition of the monitored received optical signal power takes place. In step 840, the controller selects an operational wavelength as a function of the identified transmission wavelength, and, in step 850, the controller causes the tuneable laser to generate an optical signal at the selected operational wavelength. A power transition may correspond to a transition from a detected presence to a detected absence of a received signal on the transmission port, or from a detected absence to a detected presence of a received signal on the transmission port.

Figure 9:
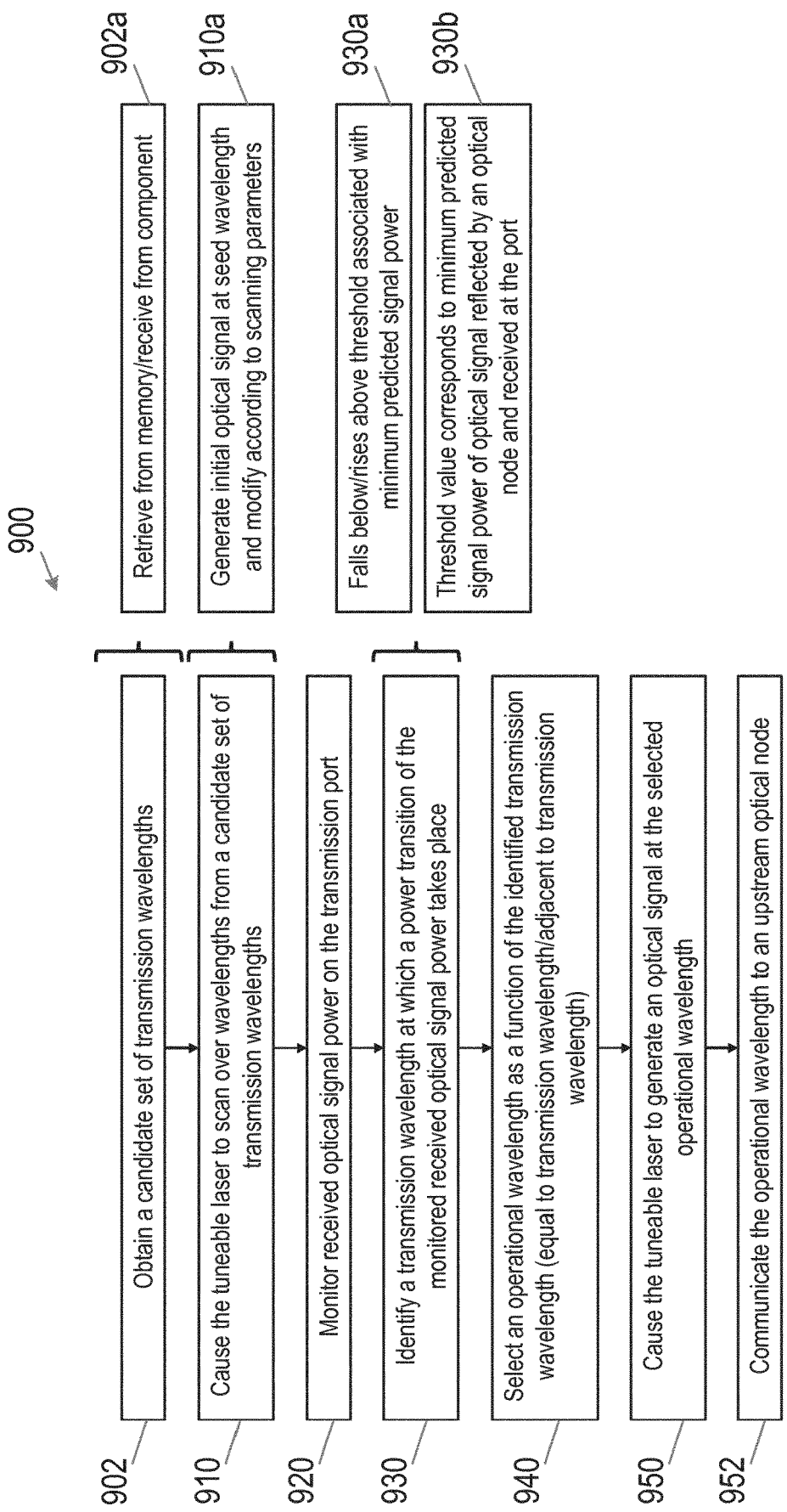
FIG. 9 is a flow chart illustrating process steps in another example of method for operating an optical transceiver.

FIG. 9 is a flow chart illustrating process steps in another example of method 900 for operating an optical transceiver. The steps of the method 900 illustrate one way in which the steps of the method 800 may be implemented and supplemented in order to achieve the above discussed and additional functionality. As for the method of FIG. 8 above, the transceiver may be a transceiver 600 and/or 700 and the method is performed by a controller of the optical transceiver.

Referring to FIG. 9, in a first step 902, the controller obtains a candidate set of transmission wavelengths. As illustrated at 902a, this may comprise retrieving the candidate set of transmission wavelengths from a memory of the optical transceiver or receiving the candidate set of transmission wavelengths from a component coupled to the optical transceiver. The component coupled to the optical transceiver may for example comprise a hosting board or other component configured with system information for a system in which the optical transceiver is deployed. The candidate set of transmission wavelengths may thus comprise those wavelengths used by a multiplexing optical node with which the transceiver will be communicating. In some examples, the candidate set of transmission wavelengths comprises Wavelength Division Multiplexing (WDM) wavelengths, and may comprise Dense Wavelength Division Multiplexing (DWDM) wavelengths.

In step 910, the controller causes the tuneable laser to scan over wavelengths from the candidate set of transmission wavelengths. As illustrated at 910a, this may comprise generating an initial optical signal at a seed wavelength, and modifying the wavelength of the generated optical signal according to a set of scanning parameters. The seed wavelength may be configured in the optical transceiver or set by another component such as a hosting board. The scanning parameters may include a step size for wavelength modification during scanning. In step 920, the controller monitors received optical signal power on the transmission port and, in step 930, the controller identifies a transmission wavelength at which a power transition of the monitored received optical signal power takes place. As discussed above, a power transition may correspond to a transition from a detected presence to a detected absence of a received signal on the transmission port, or from a detected absence to a detected presence of a received signal on the transmission port.

As illustrated at step 930a and 930b, identifying a transmission wavelength at which a power transition of the monitored received optical signal power takes place may comprise identifying a transmission wavelength at which the monitored received optical signal power falls below a threshold value associated with a minimum predicted signal power of an optical signal received on the transmission port. This may be the case for example if the optical transceiver is connected to an optical node as discussed above and comprising an optical filtering element. In such a situation, the lack of a feedback optical signal on the transmission port may indicate that the transmission wavelength matches the operational wavelength of the optical node, as the transmitted signal has been coupled to the common port of the optical node rather than coupled to the auxiliary port and reflected back to the optical transceiver.

Also as illustrated at step 930*a* and 930*b*, identifying a transmission wavelength at which a power transition of the monitored received optical signal power takes place may comprise identifying a transmission wavelength at which the monitored received optical signal power rises above a threshold value associated with a minimum predicted signal power of an optical signal received on the transmission port. This may be the case for example if the optical transceiver is connected to an optical node as discussed below and comprising an AWG. In such a situation, the presence of a feedback signal on the transmission port may indicate that the transmission wavelength is adjacent to the operational wavelength of the optical node, according to a transfer function of the optical node, as is discussed in further detail below.

In step 940, the controller selects an operational wavelength as a function of the identified transmission wavelength. This may comprise selecting the identified transmission wavelength as the operation wavelength, if the transceiver is connected to an optical node comprising an optical filtering element, or may comprise selecting as the operation wavelength a wavelength that is adjacent in a candidate set of transmission wavelengths to the identified transmission wavelength. Selecting an adjacent wavelength may comprise selecting a wavelength that is adjacent to the identified wavelength according to a transfer function of an optical node comprising an AWG and to which the port of the optical transceiver is connected.

In step 950, the controller causes the tuneable laser to generate an optical signal at the selected operational wavelength. Finally, in step 952, the controller communicates the selected operational wavelength to an upstream optical node. The upstream optical node may be hosted at a main site, for example if the transceiver is at a remote site. The upstream optical node may be an end point such as a transceiver at the main site. The operational wavelength may be communicated to the optical node on an in band frame overhead or a pilot tone.

As discussed above, the methods 800 and 900 are performed by a controller of an optical transceiver. The present disclosure provides a controller which is adapted to perform any or all of the steps of the above discussed methods.

Figure 10:
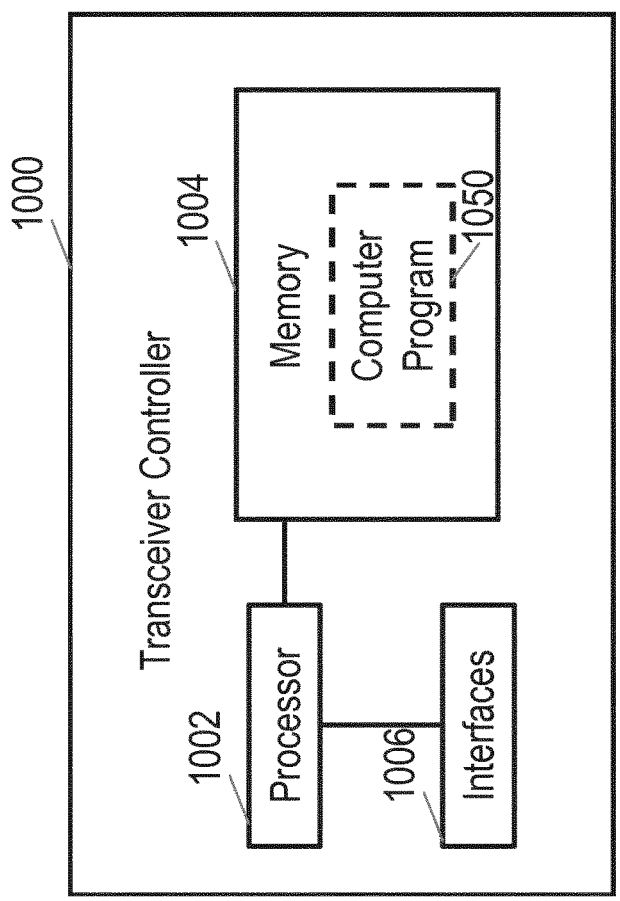
FIG. 10 is a block diagram illustrating a controller.

FIG. 10 is a block diagram illustrating a controller 1000 which may be adapted to implement the method 800 and/or 900 according to examples of the present disclosure, for example on receipt of suitable instructions from a computer program 1050. Referring to FIG. 10, the controller 1000 comprises a processor or processing circuitry 1002, and may comprise a memory 1004 and interfaces 1006. The processing circuitry 1002 is operable to perform some or all of the steps of the method 800 and/or 900 as discussed above with reference to FIGS. 8 and 9. The memory 1004 may contain instructions executable by the processing circuitry 1002 such that the controller 1000 is operable to perform some or all of the steps of the method 800 and/or 900. The instructions may also include instructions for executing one or more telecommunications and/or data communications protocols. The instructions may be stored in the form of the computer program 1050. In some examples, the processor or processing circuitry 1002 may include one or more microprocessors or microcontrollers, as well as other digital hardware, which may include digital signal processors (DSPs), special-purpose digital logic, etc. The processor or processing circuitry 1002 may be implemented by any type of integrated circuit, such as an Application Specific Integrated Circuit (ASIC), Field Programmable Gate Array (FPGA) etc. The memory 1004 may include one or several types of memory suitable for the processor, such as read-only memory (ROM), random-access memory, cache memory, flash memory devices, optical storage devices, solid state disk, hard disk drive etc.

Figure 11:
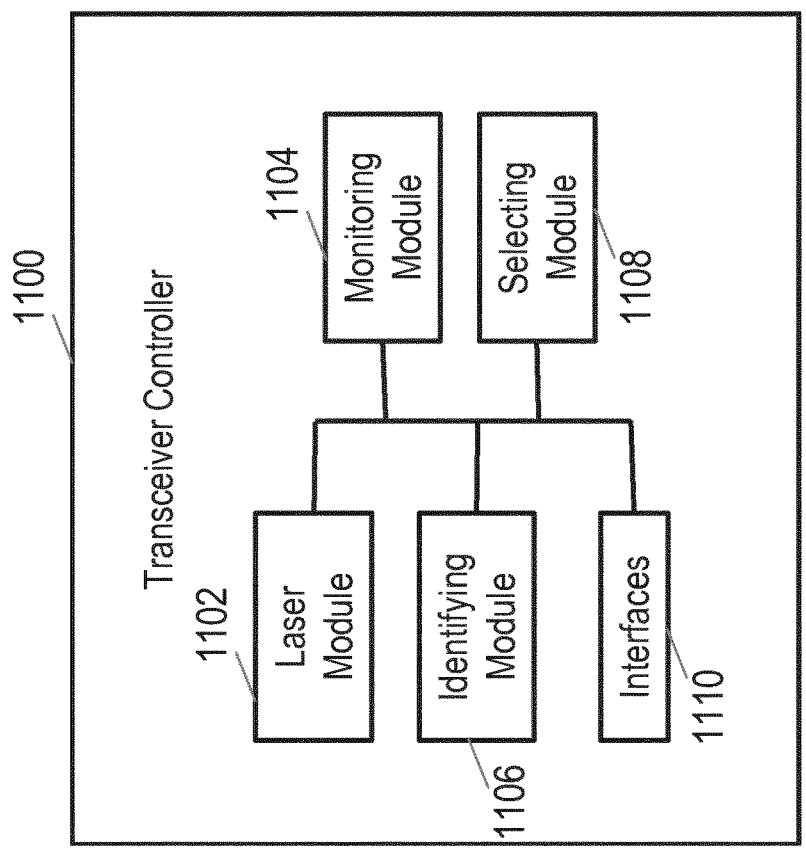
FIG. 11 is a block diagram illustrating another example of controller.

FIG. 11 illustrates functional units in another example of controller 1100 which may execute examples of the methods 800 and/or 900 of the present disclosure, for example according to computer readable instructions received from a computer program. It will be understood that the units illustrated in FIG. 11 are functional units, and may be realised in any appropriate combination of hardware and/or software. The units may comprise one or more processors and may be integrated to any degree.

Referring to FIG. 11, the controller 1100 comprises a laser module 1102 for causing the tuneable laser to scan over wavelengths from a candidate set of transmission wavelengths and for causing the tuneable laser to generate an optical signal at an operational wavelength selected by a selecting module 1108. The controller further comprises a monitoring module 1104 for monitoring received optical signal power on the transmission port. The controller 1100 further comprises an identifying module 1106 for identifying a transmission wavelength at which a power transition of the monitored received optical signal power takes place. The selecting module 1108 is for selecting an operational wavelength as a function of the identified transmission wavelength. The controller 1100 may also comprise interfaces 1110.

The apparatus and methods discussed above may be used to implement a solution for remote auto tuning of an optical transceiver that addresses some or more of the challenges discussed above with respect to the existing E2E protocols for auto tuning. One of those challenges is the time taken to auto tune. Currently available tuneable transceivers, such as a tuneable SFP+, are capable of configuring a transmission wavelength in 20 seconds from a cold start, and modifying the transmission wavelength in steps of 100 gHz in approximately 1 second, referred to as warm reconfiguration. As discussed above, transceiver circuitry according to examples of the present disclosure may maintain the optical laser in a seed frequency that can be pre-set by the hosting board. Parameters for sweeping the spectrum based on optional criteria defined by the hosting board may also be set by the transceiver circuitry. The maximum time for auto tuning according to examples of the present disclosure is associated with a situation in which a full scan of 48 wavelengths is required. In such a situation, the required time for auto tuning would be: $(1 \times 20)+(47 \times 1)=67$ seconds. This equates to the time required for a cold start configuration in the seed frequency plus time required for warm reconfiguration across the full 48 wavelengths. When compared with typical auto tuning times for E2E protocols, which are of the order of 10 minutes, a 67 second maximum auto tuning time represents a significant improvement. It will also be appreciated that no additional protocol time limitations are added when compared to the existing E2E protocol solutions.

As discussed in further detail below, a situation in which a full scan of 48 wavelengths is required may in practice be relatively rare. In many cases, a transceiver may be deployed at a remote site in which a limited number of channels (for example between 3 and 9) are typically used. These wavelengths may comprise the candidate set of wavelengths for scanning, so reducing the total auto-tuning time significantly. In some examples, the candidate set of wavelengths to scan may be limited to those wavelengths used by the Mux with which the transceiver will be communicating. These wavelengths may be known from system configuration. It will be appreciated that in such examples, remote site transceivers may tune to the Mux independently as soon as the remote site is powered up, regardless of main site commissioning, as an E2E connection is not required for auto-tuning according to examples of the present disclosure.

Figure 12:
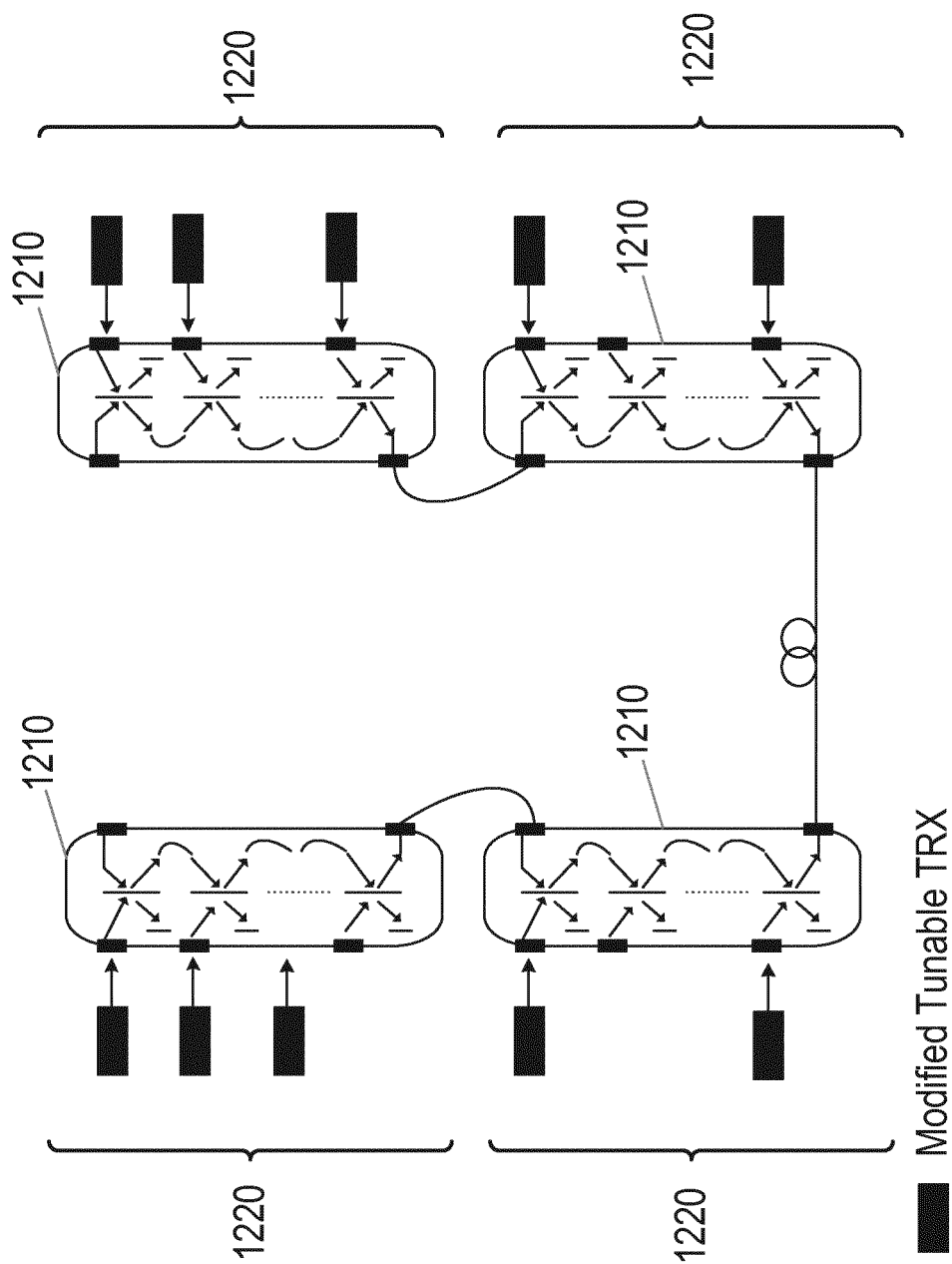
FIG. 12 illustrates an optical deployment.
Figure 13:
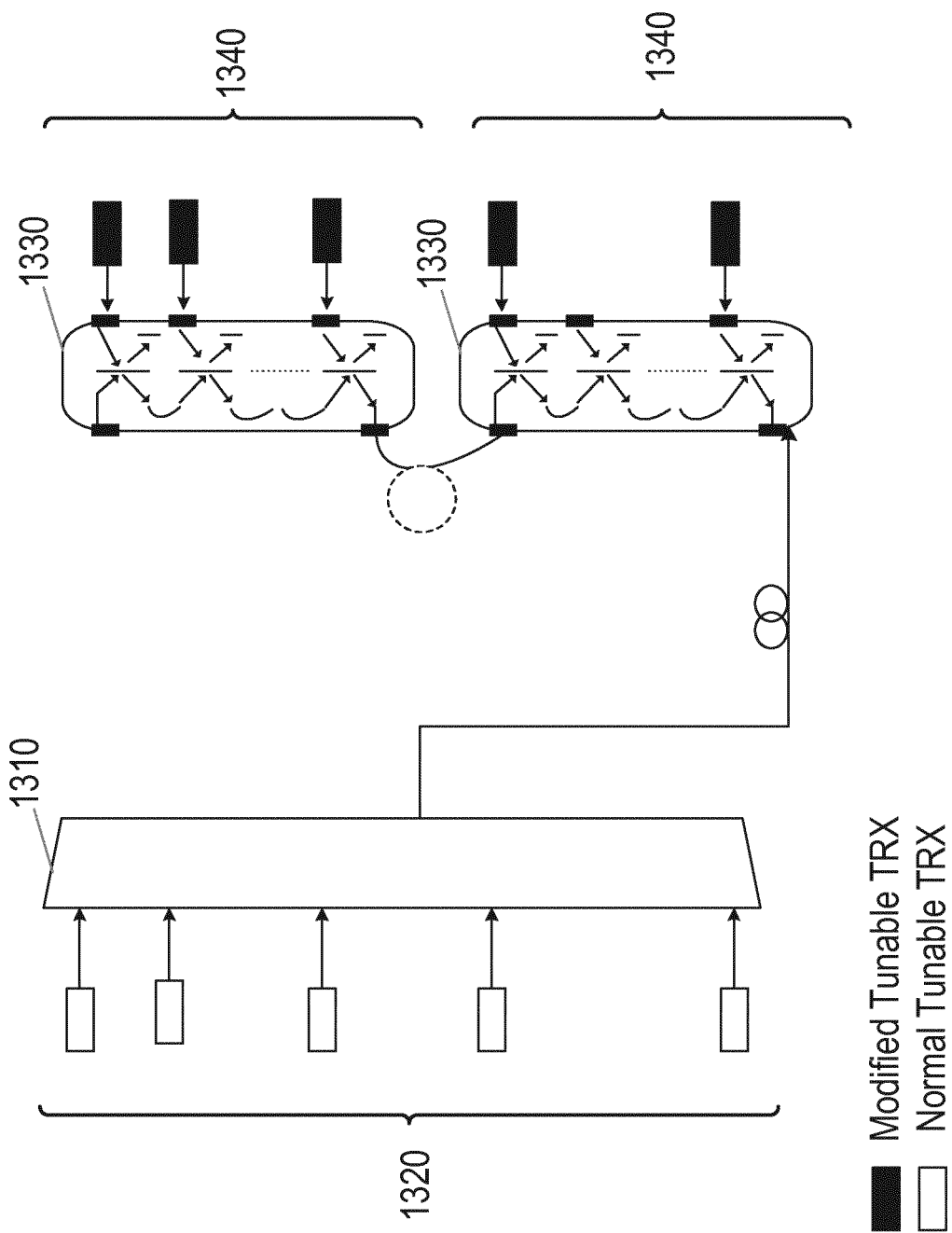
FIG. 13 illustrates another example of optical deployment.
Figure 14:
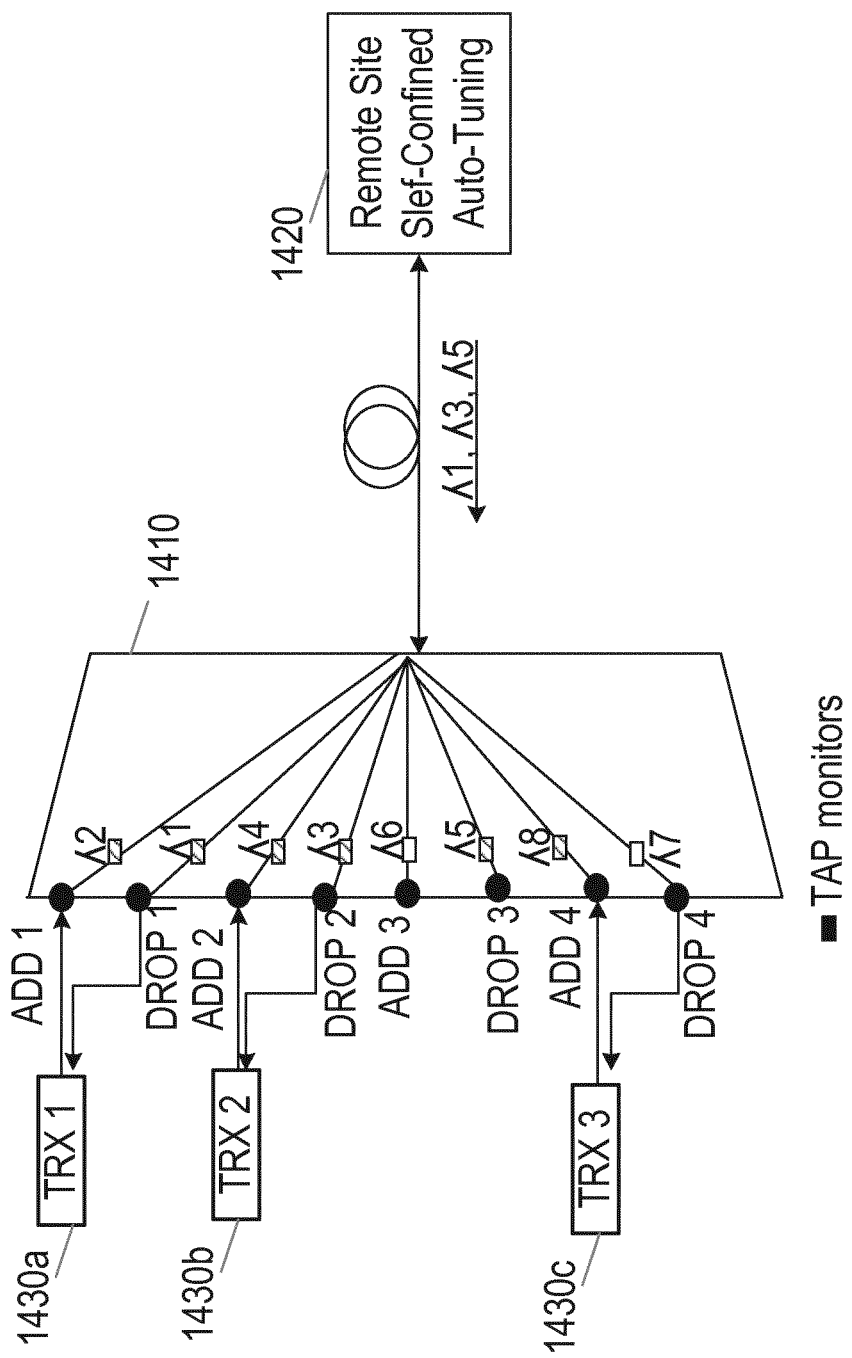
FIG. 14 illustrates a semi-passive network configuration.

Some example network scenarios in which optical nodes and transceivers according to examples of the present disclosure may be deployed are illustrated in FIGS. 12 to 14.

FIG. 12 illustrates a symmetric Point to Point (P2P) or Point to MultiPoint (P2MP) deployment. As illustrated in FIG. 12, one or more multi-channel multiplexers 1210 according to examples of the present disclosure can be chained. At remote sites, the chain can be placed at different locations, so forming a Point-to-MultiPoint topology. Transceivers 1220 according to examples of the present disclosure communicate with the multiplexers 1210. Auto tuning operates independently at both main and remote sites, so assuring fast line up if the fibers are correctly connected, and assisting with troubleshooting if the fibers are not correctly connected, as discussed in further detail below.

FIG. 13 illustrates an asymmetric P2P or P2MP deployment, comprising a standard multiplexer 1310 (for example a 48 channel AWG) and transceivers 1320 at the main site, and one or more multiplexers 1330 at the remote site. Transceivers 1340 according to examples of the present disclosure communicate with the multiplexers 1330 and auto tuning as discussed above may take place at the remote site, between the multiplexers 1330 and transceivers 1340. In the network topology illustrated in FIG. 13, it is possible to exploit the possibility for standalone auto tuning in the remote site offered by examples of the present disclosure. The wavelengths identified for transmission during the auto tuning process can then be sent upstream to the main site to inform the main site of which channels have been identified for use. This would be impossible according to existing auto tuning solutions, as an E2E connection is required before auto tuning can begin. If a communication channel is activated on the wavelength themselves, the wavelengths can directly communicate upstream to the main site transceivers the wavelength to tune to, without any handshake or close loop protocol, so speeding up the tuning process. The channel could be either an in-band frame overhead, or a pilot tone, such as the Remote Digital Diagnostics Monitoring interface (R-DDMI), which are already available in existing systems.

FIG. 14 illustrates a semi-passive network configuration, which is representative of many fronthaul networks. In this topology, an active main site with enhanced monitoring capabilities is connected to a passive remote site. The apparatus and methods of the present disclosure may be deployed in such a topology at the remote site, allowing for standalone auto tuning at the remote site, with tuned wavelengths being provided upstream regardless of the main site status. The semi passive scenario provides the multiplexer 1410 at the main site with a tap monitor, Optical Channel Monitor (OCM), or R-DDMI extraction so that the wavelengths reaching the main site from both the line fiber and client ports can be detected. This allows for checking of wavelength matching and detection of fiber-misconnection, which may then be communicated to a Local Controller, Network Management System (NMS) and/or LEDs monitors on a notification panel. Avoiding fiber misconnection can be particularly important in the case of partially equipped systems in which optical connectivity fails as a result of incorrect connections to the Mux. Detection and verification of fiber misconnection is not possible using existing solutions for auto tuning, as a wavelength at the remote site cannot be tuned without established E2E connectivity. If a cabling error causes the E2E connection to fail, then existing auto tuning solutions cannot proceed. Troubleshooting such a connection is extremely challenging and time consuming.

Connection error detection and verification according to examples of the present disclosure is discussed below with reference to FIG. 14. FIG. 14 illustrates a SFW semi-passive fronthaul with four bidirectional services, and consequently eight wavelengths numbered 1 to 8. The remote site 1420 employs one or more multiplexers, transceivers and methods according to the present disclosure. At the main site, an active mux 1410 is deployed with tap monitoring on all ports. The tap monitors can detect the light signals arriving from the Add ports and being delivered to the Drop ports of the multiplexer.

As illustrated, three transceivers 1430a, 1430b, 1430c are connected to Add/Drop ports 1, 2 and 4 corresponding to wavelength couples 1/2, 3/4 and 7/8. It will be appreciated that odd number wavelengths are used upstream and even number wavelengths are used downstream. On the remote site, wavelengths 1,3 and 5 have been auto tuned in the upstream direction. There exists therefore a mismatch in the upstream wavelengths that would have prevented auto-tuning according to existing solutions, without providing any troubleshooting indications.

With examples of the present disclosure deployed and operating at the remote site, the Add/Drop ports 1 and 2 will correctly auto tune, and TAP monitors will detect light on both the Add and Drop ports of Add/Drop ports 1 and 2. However, the TAP monitories detect light on port DROP 3 but no light on port ADD 3, raising an error message "Missing TX signal on Port 3". The TAP monitors also detect light on port ADD 4 but no light on port DROP 4, raising an error message "missing RX signal on port 4". These messages combined allow for the identification of the cabling error, and for resolution of the problem by moving transceiver 1430c from Add/Drop port 4 to Add/Drop port 3 of the Mux 1310.

Figure 15:
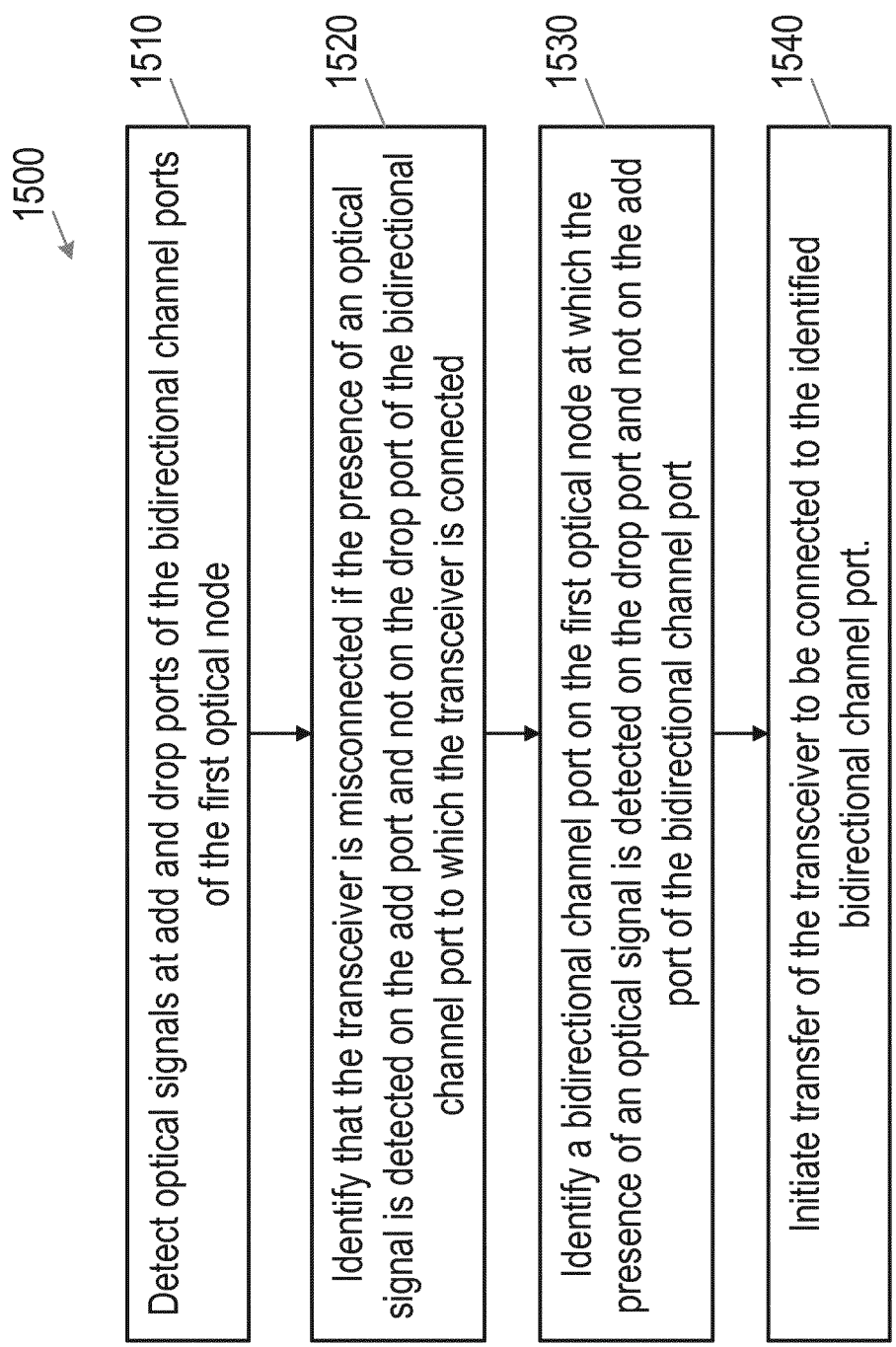
FIG. 15 is a flow chart illustrating process steps in a method for verifying a connection between a transceiver and a first optical node.

FIG. 15 is a flow chart illustrating process steps in a method 1500 for verifying a connection between a transceiver and a first optical node, wherein the first optical node is configured to transmit optical signals between the transceiver and a second optical node, wherein the first optical node comprises a plurality of bidirectional channel ports to which a transceiver may be coupled, and wherein a bidirectional channel port comprises an add port and a drop port. The optical node may for example be a mux or a mux/demux. The method is performed by a controller of the first optical node and comprises, in a first step 1510, detecting optical signals at add and drop ports of the bidirectional channel ports of the first optical node. The method further comprises, in step 1520, identifying that the transceiver is misconnected if the presence of an optical signal is detected on the add port and not on the drop port of the bidirectional channel port to which the transceiver is connected. The method may further comprise, in step 1530, identifying a bidirectional channel port on the first optical node at which the presence of an optical signal is detected on the drop port and not on the add port of the bidirectional channel port, and, in step 1540, initiating transfer of the transceiver to be connected to the identified bidirectional channel port. According to some examples of the present disclosure, the second optical node may comprise an optical node according to any of the examples described herein. The second optical node may be connected to at least one optical transceiver according to any of the examples described herein. The optical transceiver to which the second optical node is connected may be configured to carry out a method such as the method 800 or 900. The method 1500 may thus allow for the fast identification and resolution of connection errors between transceivers and the ports of a multiport optical node, facilitating installation and troubleshooting of deployments.

Figure 16:
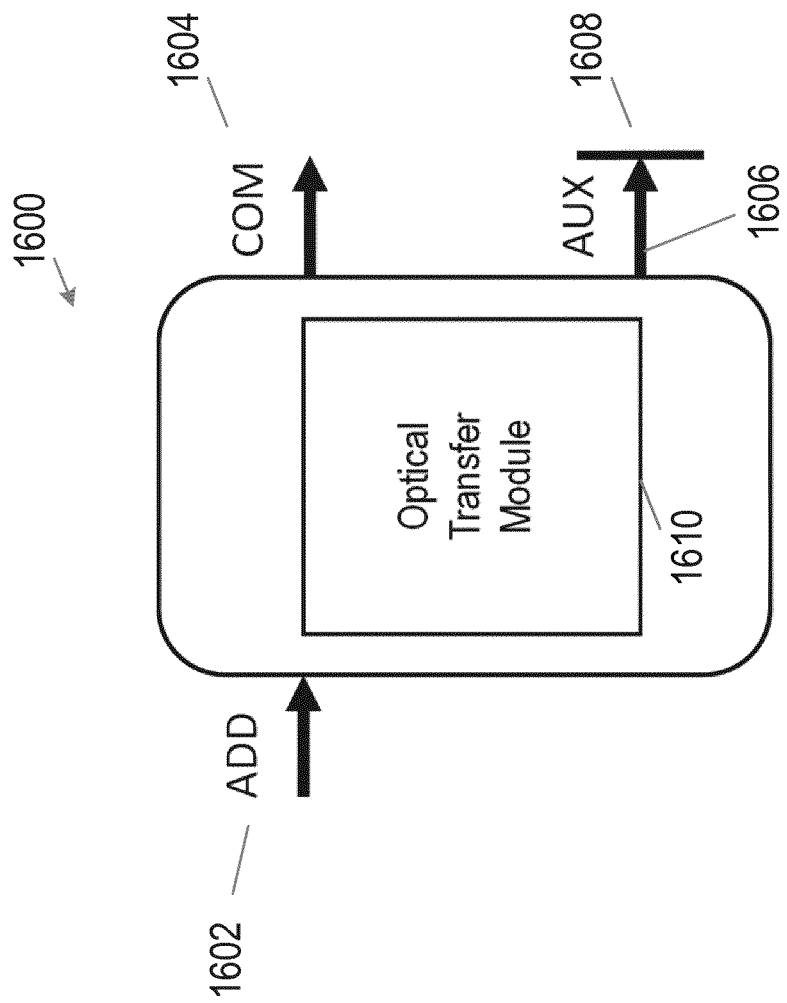
FIG. 16 is a block diagram illustrating another example of optical node.

FIG. 16 is a block diagram illustrating another example of optical node 1600 according to the present disclosure. The optical node 1600 may for example comprise a multiplexer (Mux) or a multiplexer/demultiplexer (Mux/Demux). An optical node such as the node 1600 illustrated in FIG. 16 ay be used in any of the systems, configurations or example deployments discussed above and below. Referring to FIG. 16, the optical node 1600 comprises an add port 1602, a common port 1604, an auxiliary port 1606, an optical transfer module 1610 and a reflecting element 1608 in the form of a mirror that is coupled to the auxiliary port 1606. The optical transfer module 1610 is configured to couple a signal received on the add port 1602 and matching an operational wavelength of the optical node to the common port 1604, and to couple a signal having a predetermined wavelength that is received on the add port 1602 and not matching an operational wavelength of the optical node to the auxiliary port 1606. The predetermined wavelength may comprise a wavelength that is adjacent to the operational wavelength of the optical node in a candidate set of wavelengths. The optical node 1600 comprises an Arrayed Waveguide Grating (AWG), and the optical transfer module 1610 comprises the first and second planar regions and plurality of waveguides coupling the planar regions that are generally comprised within an AWG. The optical transfer module is 1610 is configured to couple a signal received on the add port of the AWG and having a first wavelength to the common port of the AWG, and to couple a signal received on the add port of the AWG and having a second wavelength to the auxiliary port of the AWG. The first wavelength comprises the operational wavelength of the AWG, and the second wavelength comprises a wavelength that is adjacent to the operational wavelength of the AWG according to a transfer function of the AWG. It will be appreciated that in examples of the present disclosure, the term "adjacent" may refer to a specific relationship to the operational wavelength, that is "adjacent" may comprise the wavelength that precedes the operational wavelength in an ordered sequence according to the transfer function.

A transfer function of the AWG such as the optical node 1610 defines a connectivity between input and output ports of the AWG according to the wavelength of a signal input on an input port. In the optical node 1610, the add port 1602 comprises an input port and the common port 1604 and the auxiliary port 1606 comprise output ports. The transfer function may be expressed as a connection matrix in which the entries of the matrix comprise wavelengths that connect a specific input port to a specific output port, as discussed in further detail below.

In some examples, as discussed in greater detail below, the optical node may comprise a plurality of add ports and a corresponding plurality of operational wavelengths. The optical transfer module in such examples is configured to couple signals received on the add ports to the common port and the auxiliary port of the AWG such that, for each of the add ports, a signal received on the add port and having a wavelength matching the operational wavelength for that add port is coupled to the common port of the AWG, and a signal received on the add port and having a wavelength that is adjacent to the operational wavelength for that add port according to a transfer function of the AWG is coupled to the auxiliary port of the AWG.

The example optical node 1600 discussed above is based on an AWG multiplexer, which is typically used when channel count is high, such as for a main site of a DWDM C-RAN, a metro hub, etc. The optical node 1600 is an example of a 2-port AWG filter, which is itself a sub-case of the more general N×N multiplexer. The N×N AWG multiplexer is characterised by a transfer function matrix, in which each output port couples a shifted combination of input wavelengths. An N×N AWG multiplexer may be either cyclic over a given Free-Spectral-Range (FSR) or non-cyclic.

A cyclic N×N AWG multiplexer has a transfer function matrix as illustrated in FIG. 17. The matrix gives the wavelengths that couple input ports (rows) with output ports (columns). As an example, a 2-port AWG is considered that is constructed to deliver a transfer function according to the last two columns of the matrix illustrated in FIG. 17. Referring to FIG. 17, if a signal of wavelength λ0 is input to input Port 1 this signal will be coupled with the desired output Port 1. Output Port 1 corresponds to the common port of the optical node 1600, which is connected to a line fiber. If, instead, a signal of wavelength λN−1 is input to input Port 1, then it will be coupled to output Port 2, which corresponds to the auxiliary port of the optical node 1600. The auxiliary port thus continues to serve as a monitor, with the presence of a signal on this port indicating that the correct operational wavelength to be tuned to for a coupling to the common Port 1 is the next adjacent wavelength in the transfer function. This criterion is therefore used for auto-tuning as discussed above. When wavelengths are correctly tuned, they exit output Port 1 and Port 2 is empty. There is only one exception to this in the 'cyclic-AWG' case as indicated in FIG. 17. The first row of the matrix in FIG. 17 illustrates for Ports 1 and 2 lambda N−1 and lambda 0 respectively, which are not adjacent, owing to the cyclic property. The adjacency still holds if the tuning is extended to lambda −1 as in the non-cyclic case.

Figure 18:
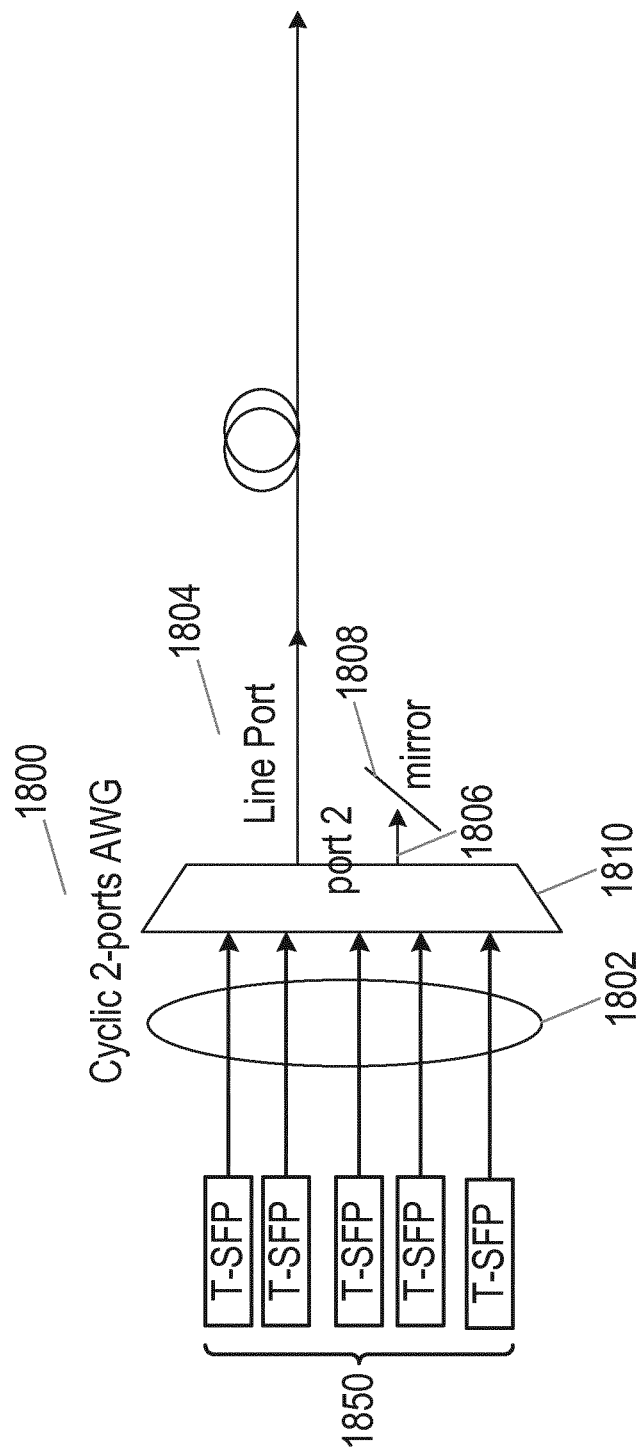
FIG. 18 illustrates an optical node connected to a plurality of optical transceivers.

FIG. 18 illustrates an optical node 1800 that is connected to a plurality of optical transceivers 1850, which may be optical transceivers 600, 700, and may conduct methods 800, 900 as discussed above. The optical node 1800 comprises a plurality of add ports 1802, an optical transfer module 1810, a common port 1804 (illustrated as the line port connected to the line fiber) and an auxiliary port 1806 (illustrated as port 2). The optical node 1800 further comprises a mirror 1808 coupled to the auxiliary port 1806. The optical node 1800 is a cyclic 2-port AWG. Each transceiver 1850 may auto-tune to the correct operational wavelength by scanning all transmission wavelengths from a candidate set, such as (D)WDM wavelengths, or a subset of (D)WDM wavelengths used to the optical node 1800. Each transceiver, while scanning transmission frequencies, detects reflected power reived back from the add port to which it is connected. When the reflected power changes from Low level to High level (a power transition comprising power rising above a threshold) the scanning is stopped, as the transmission wavelength associated with the power transition of the reflected signal power has been identified. The operational wavelength of the transceiver is then selected and set to be a wavelength that is adjacent to the identified wavelength in the transfer function of the optical node 1800. It will be appreciated that as the auxiliary port 1806 and coupled mirror 1808 are common to all wavelengths, each transceiver 1850 is individually auto-tuned. This contrasts with an auto-tuning process for an optical node 200 as described above, for which parallel auto-tuning is possible.

Cyclic AWG are more difficult to design at high port count than non-cyclic AWG, and an optical node 1600, 1800 according to examples of the present disclosure may also be realised using a non-cyclic AWG. The only additional design consideration is to extend the transceiver tunability range to one additional adjacent wavelength. This is shown in the transfer function for the non-cyclic case illustrated in FIG. 19. With reference to FIG. 19, it can be seen that an additional $\lambda-1$ is used, extending the range from $[\lambda 0, \lambda N-1]$ to $[\lambda-1, \lambda N-1]$. This is achievable by adding one calibration point, for example from 48 to 49 wavelength calibration points. If only a subset of the nominal wavelengths is used in the systems, such as 24 out of 48 or 32 out of 48, then no additional calibration is used.

Figure 20:
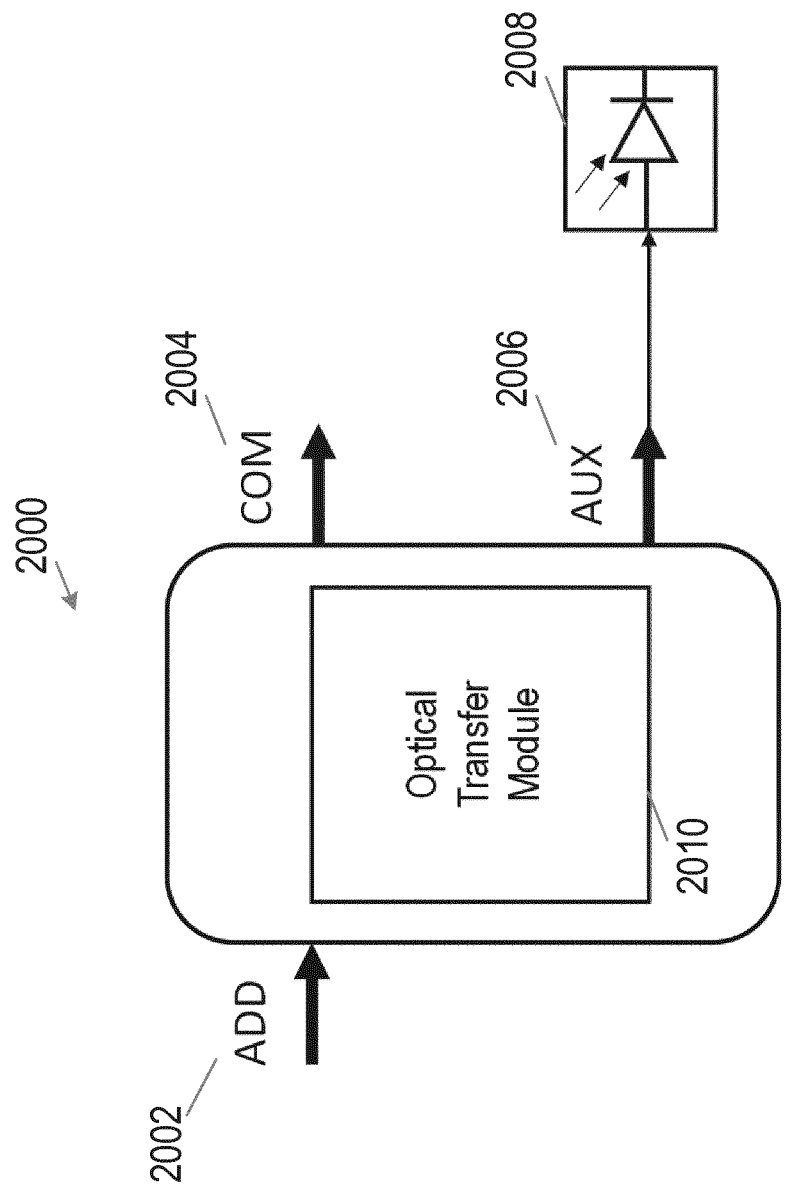
FIG. 20 illustrates another example of optical node.
Figure 21:
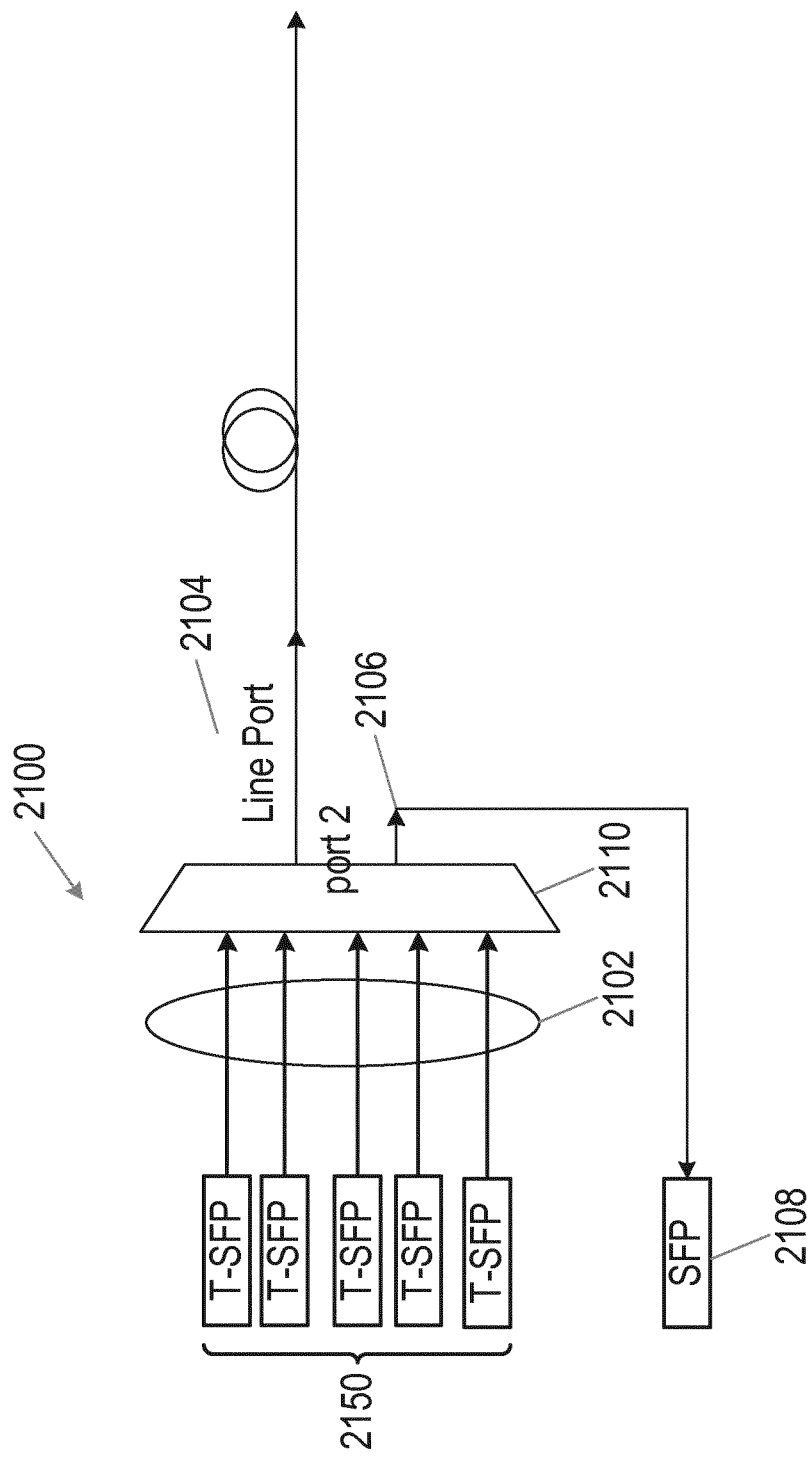
FIG. 21 illustrates an optical node connected to a plurality of optical transceivers.

In a still further example of the present disclosure, the mirror 8 of the optical node 1600 may be replaced with a monitoring element, as illustrated in FIGS. 20 and 21 and discussed below.

Referring to FIG. 20, an optical node 2000 comprises an add port 2002, a common port 2004, an auxiliary port 1006, an optical transfer module 2010 and a monitoring element 2008 configured to monitor optical signal power of an optical signal received on the auxiliary port 2006. The optical transfer module is configured to couple a signal received on the add port 2002 and matching an operational wavelength of the optical node to the common port 2004, and to couple a signal received on the add port 2002 and not matching an operational wavelength of the optical node to the auxiliary port 2006.

FIG. 21 illustrates an optical node 2100 that is connected to a plurality of optical transceivers 2150. The optical node 2100 comprises a plurality of add ports 2102, an optical transfer module 2110, a common port 2104 (illustrated as the line port connected to the line fiber) and an auxiliary port 2106 (illustrated as port 2). The optical node 2100 further comprises a monitoring element 1808 coupled to the auxiliary port 2106. The optical node 2100 comprises an AWG, and the optical transfer module 2110 comprises the first and second planar regions and plurality of waveguides coupling the planar regions that are generally comprised within an AWG. As illustrated in FIG. 21, the optical node 20 may comprise a plurality of add ports and a corresponding plurality of operational wavelengths, and the optical transfer module 2110 is configured to couple signals received on the add ports to the common port and the auxiliary port of the AWG such that, for each of the add ports, a signal received on the add port and having a wavelength matching the operational wavelength for that add port is coupled to the common port of the AWG, and a signal received on the add port and having a wavelength that is adjacent to the operational wavelength for that add port according to a transfer function of the AWG is coupled to the auxiliary port of the AWG.

The monitoring element 2108 that is coupled to the auxiliary port 2108 may perform the monitoring that in previously discussed examples was performed at the optical transceiver. The monitoring element may thus identify when a power transition takes place on the signal power at the auxiliary port, indicating that the correct operational wavelength for the optical node is the next adjacent wavelength according to the transfer function of the optical node. The monitoring element 2108 may be embedded in the same subsystem as the optical node, example, for example comprising an extra monitoring SFP plugged in the same shelf as the other transceivers 2150. In such examples, modification of the transceivers 2150 may be avoided, as the monitoring of signal power is performed directly at the auxiliary port, as opposed to in the transceivers using the reflected signal from the auxiliary port.

In some aspects, the disclosure includes a system comprising the optical transceiver, including monitoring element, and the multiplexer of any example. The transceiver is configured to generate a wavelength, which is determined to be at the correct frequency by monitoring an output from the multiplexer. For example, the monitoring is of a particular port of the multiplexer which is configured to reflect or transmit to that particular port an incorrect frequency wavelength. As such, the system uses the multiplexer to provide an optical signal which indicates an incorrectly tuned wavelength is being generated by the transceiver. This optical signal can be monitored by the transceiver locally, i.e. without requiring detection at the distant end of the transmission. Thus, local auto-tuning is achieved.

Figure 22:
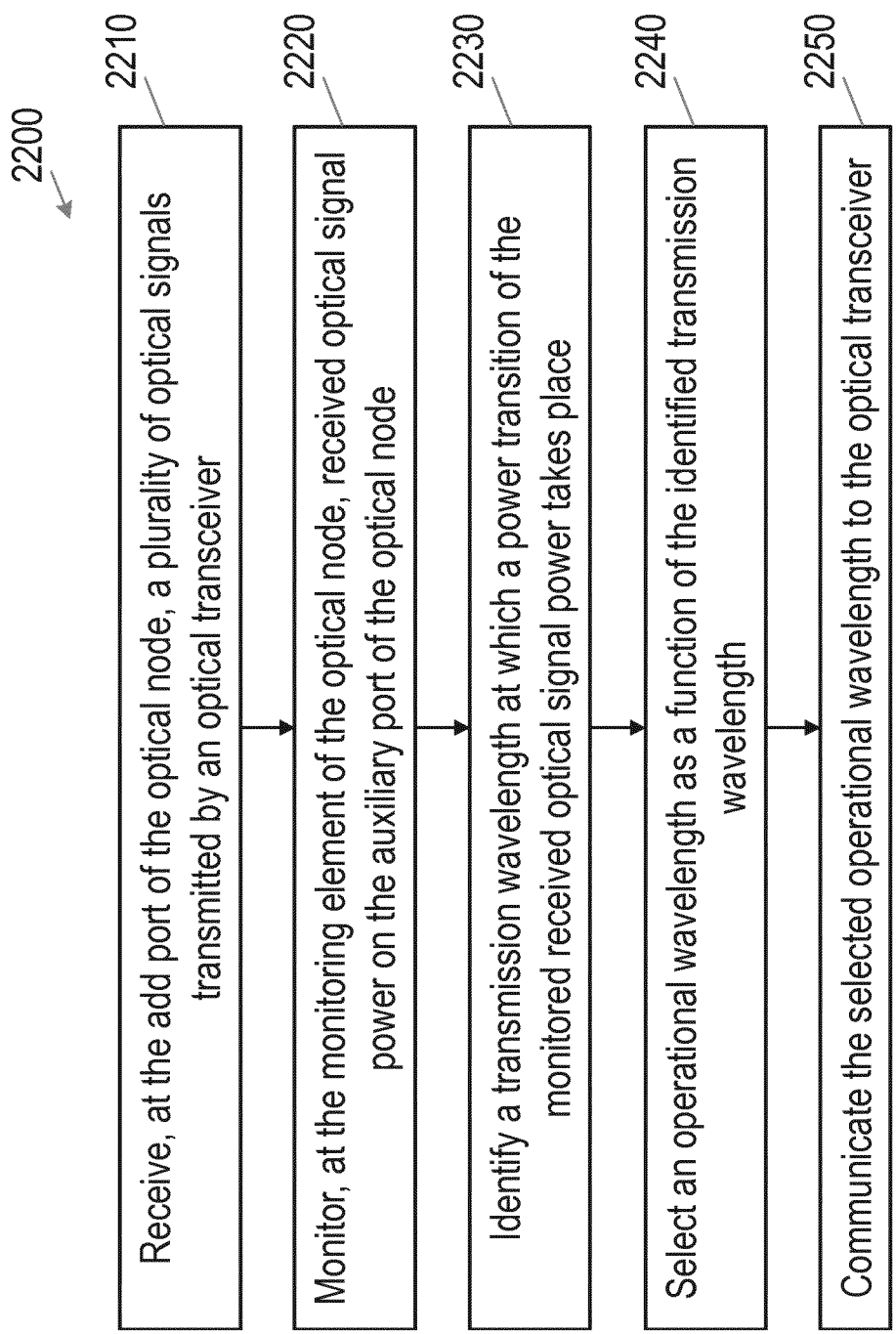
FIG. 22 is a flow chart illustrating process steps in a method that may be carried out by an optical node.

FIG. 22 is a flow chart illustrating process steps in a method 2200 that may be carried out by an optical node such as the optical node 2000 or 2100. Referring to FIG. 22, the method comprises, in a first step 2210, receiving, at the add port of the optical node, a plurality of optical signals transmitted by an optical transceiver. The method then comprises, in step 2220, monitoring, at the monitoring element of the optical node, received optical signal power on the auxiliary port of the optical node. In step 2230, the method comprises identifying a transmission wavelength at which a power transition of the monitored received optical signal power takes place. In step 2240, the method comprises selecting an operational wavelength as a function of the identified transmission wavelength and finally, at step 2250, the method comprises communicating the selected operational wavelength to the optical transceiver.

As discussed above with reference to the method 900 carried out by an optical transceiver, the step of selecting an operational wavelength as a function of the identified transmission wavelength may comprise selecting as the operational wavelength a wavelength that is adjacent in a candidate set of transmission wavelengths to the identified transmission wavelength. Selecting an adjacent wavelength may comprise selecting a wavelength that is adjacent to the identified wavelength according to a transfer function of the optical node.

Communicating the selected operational wavelength to the optical transceiver may comprise sending a control message to the optical transceiver, the control message containing the selected operational wavelength.

Figure 23:
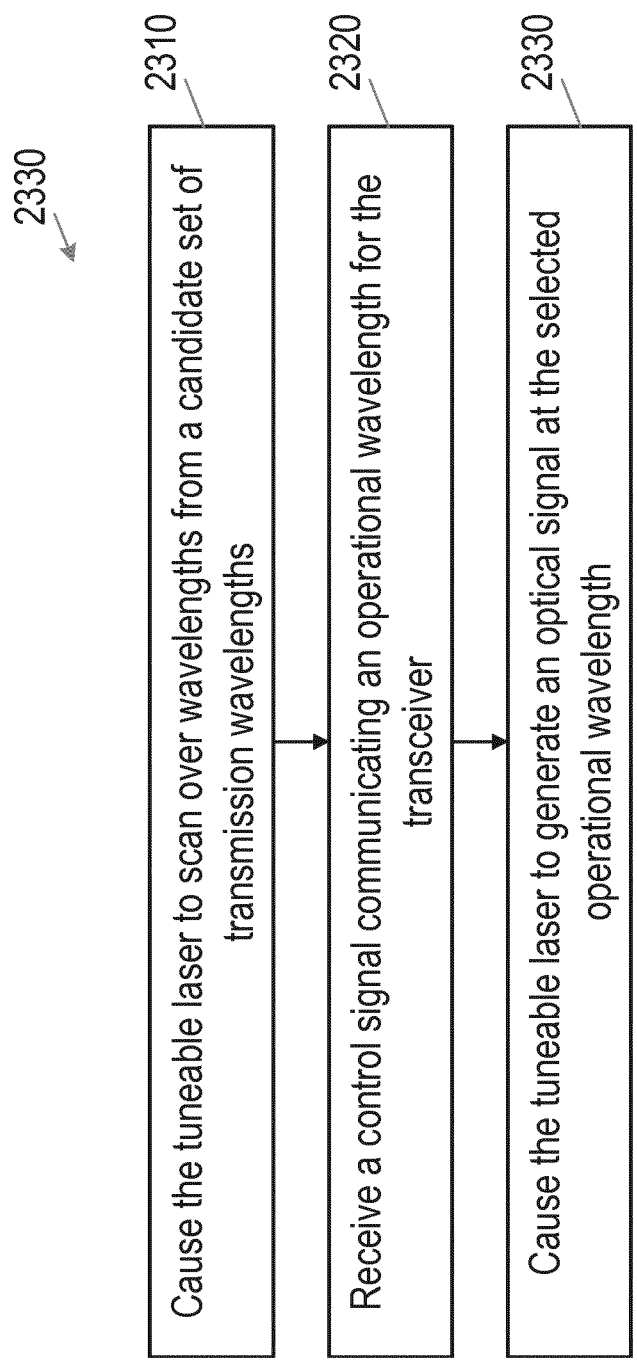
FIG. 23 is a flow chart illustrating process steps in a method that may be carried out by a controller of an optical transceiver.

The method 2200, performed by an optical node, may be complemented by a method 2300 performed by an optical transceiver and illustrated in FIG. 23. The optical transceiver comprises a tuneable laser configured to generate an optical signal and a port for transmitting the generated optical signal and operable to receive an optical signal. Referring to FIG. 23, the method 2300, performed by a controller of the optical transceiver, comprises, in a first step 2310, causing the tuneable laser to scan over wavelengths from a candidate set of transmission wavelengths. In step 2320, the controller receiving a control signal communicating an operational wavelength for the transceiver, and, in step 2330, the controller causes the tuneable laser to generate an optical signal at the selected operational wavelength. The control signal may for example be received from an optical node to which the transceiver is coupled.

As discussed above, the method 2200 is performed by an optical node. The present disclosure provides an optical node which is adapted to perform any or all of the steps of the above discussed method.

Figure 24:
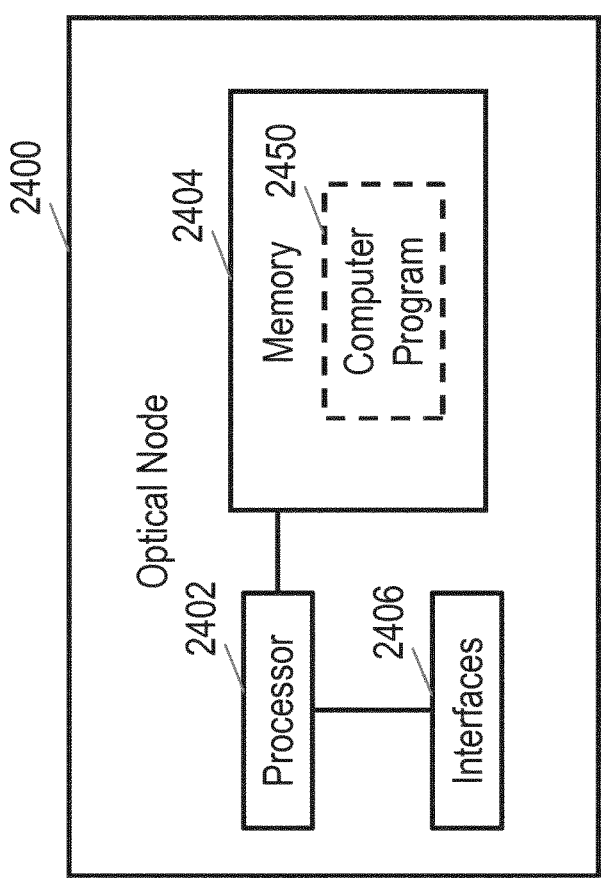
FIG. 24 is a block diagram illustrating an optical node.

FIG. 24 is a block diagram illustrating an optical node 2400 which may be adapted to implement the method 2200 according to examples of the present disclosure, for example on receipt of suitable instructions from a computer program 2250. Referring to FIG. 22, the optical node 2400 comprises a processor or processing circuitry 2402, and may comprise a memory 2404 and interfaces 2406. The processing circuitry 2402 is operable to perform some or all of the steps of the method 2200 as discussed above with reference to FIG. 22. The memory 2404 may contain instructions executable by the processing circuitry 2402 such that the optical node 2400 is operable to perform some or all of the steps of the method 2200. The instructions may also include instructions for executing one or more telecommunications and/or data communications protocols. The instructions may be stored in the form of the computer program 2450. In some examples, the processor or processing circuitry 2402 may include one or more microprocessors or microcontrollers, as well as other digital hardware, which may include digital signal processors (DSPs), special-purpose digital logic, etc. The processor or processing circuitry 2402 may be implemented by any type of integrated circuit, such as an Application Specific Integrated Circuit (ASIC), Field Programmable Gate Array (FPGA) etc. The memory 2404 may include one or several types of memory suitable for the processor, such as read-only memory (ROM), random-access memory, cache memory, flash memory devices, optical storage devices, solid state disk, hard disk drive etc.

Figure 25:
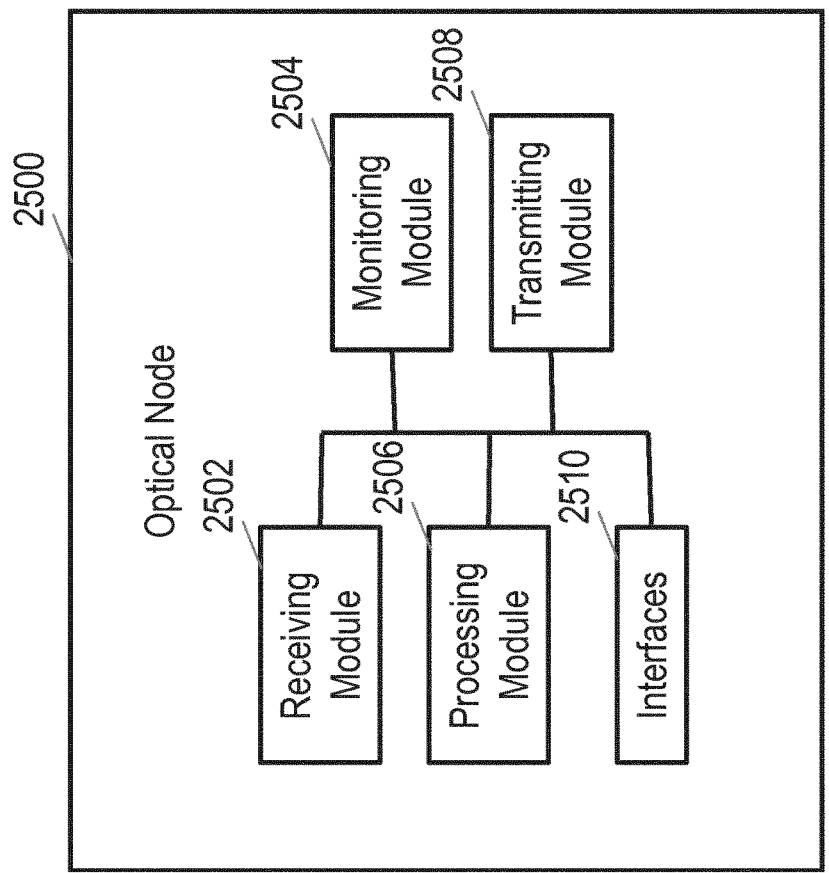
FIG. 25 is a block diagram illustrating another example of optical node.

FIG. 25 illustrates functional units in another example of optical node 2500 which may execute examples of the method 2200 of the present disclosure, for example according to computer readable instructions received from a computer program. It will be understood that the units illustrated in FIG. 25 are functional units, and may be realised in any appropriate combination of hardware and/or software. The units may comprise one or more processors and may be integrated to any degree. The optical node comprises the add port, common port, auxiliary port, optical transfer module and monitoring element of the optical node 2000, illustrated at FIG. 20.

Referring to FIG. 25, the optical node 2500 comprises a receiving module 1502 for receiving, at the add port of the optical node, a plurality of optical signals transmitted by an optical transceiver, and a monitoring module 2504 for monitoring, at the monitoring element of the optical node, received optical signal power on the auxiliary port of the optical node. The optical node 2500 further comprises a processing module 2506 for identifying a transmission wavelength at which a power transition of the monitored received optical signal power takes place and for selecting an operational wavelength as a function of the identified transmission wavelength. The optical node further comprises a transmitting module 2508 for communicating the selected operational wavelength to the optical transceiver. The optical node 2500 may also comprise interfaces 2510.

Figure 26:
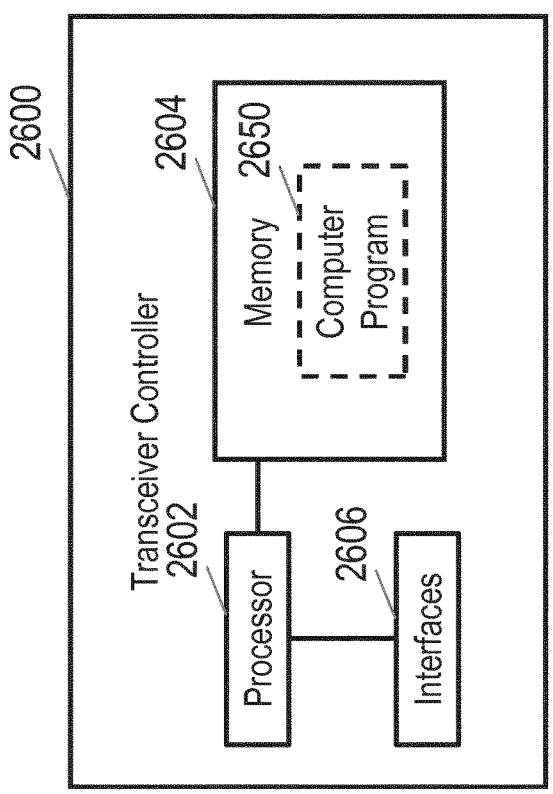
FIG. 26 is a block diagram illustrating a controller of an optical transceiver.

FIG. 26 is a block diagram illustrating an optical transceiver controller 2600 which may be adapted to implement the method 2300 according to examples of the present disclosure, for example on receipt of suitable instructions from a computer program 2650. Referring to FIG. 26, the controller 2600 comprises a processor or processing circuitry 2602, and may comprise a memory 2604 and interfaces 2606. The processing circuitry 2602 is operable to perform some or all of the steps of the method 2300 as discussed above with reference to FIG. 23. The memory 2604 may contain instructions executable by the processing circuitry 2602 such that the controller 2600 is operable to perform some or all of the steps of the method 2300. The instructions may also include instructions for executing one or more telecommunications and/or data communications protocols. The instructions may be stored in the form of the computer program 2650. In some examples, the processor or processing circuitry 2602 may include one or more microprocessors or microcontrollers, as well as other digital hardware, which may include digital signal processors (DSPs), special-purpose digital logic, etc. The processor or processing circuitry 2402 may be implemented by any type of integrated circuit, such as an Application Specific Integrated Circuit (ASIC), Field Programmable Gate Array (FPGA) etc. The memory 2604 may include one or several types of memory suitable for the processor, such as read-only memory (ROM), random-access memory, cache memory, flash memory devices, optical storage devices, solid state disk, hard disk drive etc.

Figure 27:
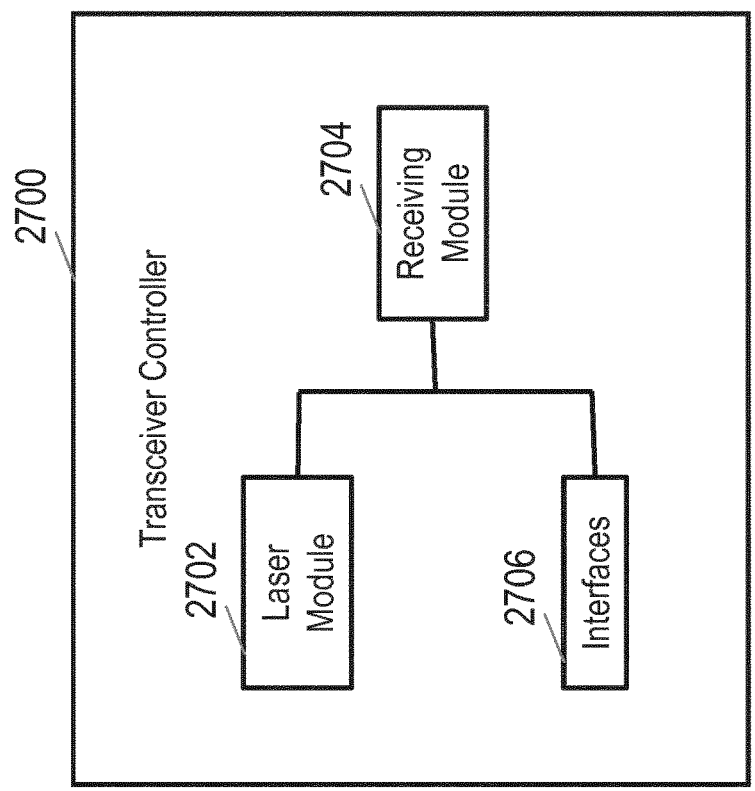
FIG. 27 is a block diagram illustrating another example of controller of an optical transceiver.

FIG. 27 illustrates functional units in another example of optical transceiver controller 2700 which may execute examples of the method 2300 of the present disclosure, for example according to computer readable instructions received from a computer program. It will be understood that the units illustrated in FIG. 27 are functional units, and may be realised in any appropriate combination of hardware and/or software. The units may comprise one or more processors and may be integrated to any degree. The optical transceiver comprises a tuneable laser configured to generate an optical signal and a port for transmitting the generated optical signal and operable to receive an optical signal.

Referring to FIG. 27, the optical transceiver controller 2700 comprises a laser module 2702 for causing the tuneable laser to scan over wavelengths from a candidate set of transmission wavelengths, and a receiving module 2704 for receiving a control signal communicating an operational wavelength for the transceiver. The laser module 2702 is also for causing the tuneable laser to generate an optical signal at the selected operational wavelength. The controller 2700 may also comprise interfaces 2706.

Aspects and examples of the present disclosure thus provide an optical node, transceiver and associated methods that enable the fast auto-tuning of an optical transceiver before an E2E optical connection has been established or without requiring communication across the optical connection. Direct optical feedback, which may be passive optical feedback, is provided from a multiplexer to a transceiver so that a self-confined wavelength tuning can be performed locally (i.e. either within the same node or site) with no requirement of E2E handshaking. This speeds up the process of auto-tuning and simplifies fiber misconnection troubleshooting, as wavelengths will be correctly coupled to the fiber link between a remote site and main site before E2E connectivity is established.

Passive optical feedback is provided by placing a mirror on an auxiliary or monitoring port of the multiplexer. An in-out transfer function of this port may have the effect of cancelling out the correct wavelength when received at the input port and passing at least one of the wrong input wavelengths. The wrong wavelength passing the auxiliary port is reflected back by the mirror and detected by a dedicated photodiode that is integrated in the transceiver without need of any fabrication process change. Associated auto-tuning methods according to the present disclosure are based on scanning all wavelengths until a proper power transition is detected on the monitoring photodiode.

Two principal examples of multiplexing optical node are discussed above, with different monitoring port design according to the structure of an optical transfer module within the node. The optical transfer module may comprise an optical filtering element such as a Thin Film Filter, or may comprise components of an Arrayed Waveguide Grating (AWG).

Within an optical node comprising an optical filtering element, the auxiliary port comprises the unused port corresponding to an ADD signal that is reflected when it does not match the passband of the filter. All non-matching wavelengths are reflected. The correct wavelength for auto-tuning corresponds to the wavelength for which reflection is absent owing to correct coupling with the multiplexer bandpass response. All transceivers connected to a multi-port optical node can auto-tune in parallel and this structure can be cascaded to form a multi-channel multiplexer.

Within an optical node comprising a 2-port the first port comprises the common port connected to the fiber line. The second port comprises the auxiliary port. This port is designed to pass input wavelengths that are shifted with respect to the first port. A mirror, placed externally or internally in front of the second port, reflects the signal on the second port back to a transceiver and the transceiver monitors the reflection. In another example, the auxiliary port can be connected to an external monitoring device, such as an SFP, meaning the additional monitoring photodiode may be omitted from the transceiver. Only the wavelength that is adjacent to the correct wavelength is reflected to the transceiver or detected by the monitoring device. With an AWG based optical node, transceiver scanning is performed one at a time, as the monitoring port is common to all wavelengths. Detection of the signal on the auxiliary port means that the correct wavelength for coupling to the common port is the adjacent one according to the working principle of the two-port multiplexer (that is according to its transfer function).

Aspects and examples of the present disclosure may save considerable deployment time, as configuration of wavelengths is both fast and automatic, and does not require an E2E connection to be established. Fiber misconnection troubleshooting is also simplified by enabling auto-tuning without the need for E2E connectivity, as wavelengths are coupled to a line fiber even in the case of a fiber misconnection.

Some of the most significant time gains in the auto-tuning process may be achieved when aspects of the present disclosure are implemented in remote sites in which 3 to 9 channels are typically used, so reducing the number of wavelengths to be scanned. All remote nodes will tune independently once the remote site is powered up, regardless of the status of main site commissioning.

It will be appreciated that modification of optical transceivers and optical nodes to include a monitoring element or reflecting element as described in the present disclosure is both simple and low-cost. Such modification does not require any change in the fabrication process.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. An optical node configured to multiplex optical signals, the optical node comprising:
   an add port;
   a common port;
   an auxiliary port;
   an optical transfer module; and
   a reflecting element coupled to the auxiliary port,
   wherein the optical transfer module is configured to couple a signal received on the add port to:
      the common port, when a wavelength of the signal received on the add port matches an operational wavelength of the optical node, and
      the auxiliary port, when the wavelength of the signal received on the add port does not match an operational wavelength of the optical node;
   wherein the reflecting element is configured to reflect a signal received on the auxiliary port to the add port;
   wherein the optical transfer module comprises an optical filtering element;
   wherein the optical filtering element comprises a thin film filter, and wherein the thin film filter comprises:
      an add port coupled to the add port of the optical node;
      a common port coupled to the common port of the optical node;
      an express port coupled to the common port of the optical filtering element via a filter layer; and
      the filter layer configured to couple a signal received on the add port of the optical filtering element to:
         the common port of the optical filtering element, when the signal received on the add port of the optical filtering element matches a pass-band of the filter layer;
         the auxiliary port of the optical node, when the signal received on the add port of the optical filtering element does not match a pass-band of the filter layer; and
   wherein the operational wavelength of the optical node comprises a wavelength matching a pass band of the filter layer.

2. The optical node of claim 1, wherein the optical transfer module is configured to couple to the auxiliary port any signal received on the add port that has a wavelength not matching an operational wavelength of the optical node.

3. The optical node of claim 1, further comprising:
   a plurality of add ports; and
   corresponding pluralities of optical filtering elements, auxiliary ports and reflecting elements coupled to the auxiliary ports, wherein:
   each add port of the optical node is coupled to an add port of a corresponding optical filtering element;
   the filter layer of each optical filtering element is configured to couple any signal received on the add port of the optical filtering element and not matching a pass-band of the filter layer to a respective auxiliary port of the optical node; and each reflecting element is configured to reflect a signal received on its coupled auxiliary port to the add port of the optical node to which the optical filtering element from which the signal on its coupled auxiliary port was received is coupled.

4. The optical node of claim 3, wherein each optical filtering element further comprises an express port that is coupled to its common port via its filter layer, and wherein the optical filtering elements are connected in series, such that a signal from a common port of a first optical filtering element is input to an express port of a second optical filtering element.

5. The optical node of claim 1, wherein the optical node is further configured to demultiplex optical signals, and wherein the optical node further comprises:

a drop port, and a corresponding optical filtering element, wherein:

the corresponding optical filtering element comprises an express port, a common port, a drop port coupled to the drop port of the optical node, and a filter layer; and the filter layer is configured to couple a signal received on the express port to:

the drop port, when the signal received on the express port matches a pass-based of the filter layer; and the common port, when the signal received on the express port does not match a pass-based of the filter layer.

6. The optical node of claim 1, wherein the optical transfer module is configured to couple a signal received on the add port to the auxiliary port, when the signal received on the add port has a predetermined wavelength that does not match an operational wavelength of the optical node.

7. An optical node configured to multiplex optical signals, the optical node comprising:

an add port;

a common port;

an auxiliary port;

an optical transfer module; and a reflecting element coupled to the auxiliary port, wherein the optical transfer module is configured to couple a signal received on the add port to:

the common port, when a wavelength of the signal received on the add port matches an operational wavelength of the optical node, and the auxiliary port, when the wavelength of the signal received on the add port does not match an operational wavelength of the optical node;

wherein the reflecting element is configured to reflect a signal received on the auxiliary port to the add port;

wherein the optical transfer module comprises first and second planar regions and a plurality of waveguides coupling the planar regions;

wherein the optical node comprises an Arrayed Waveguide Grating (AWG);

wherein the optical transfer module is configured to couple a signal received on the add port of the AWG to:

the common port of the AWG when the signal received on the add port has a first wavelength, and the auxiliary port of the AWG when the signal received on the add port has a second wavelength;

wherein the first wavelength is the operational wavelength of the AWG;

wherein the second wavelength is a wavelength that is adjacent to the operational wavelength of the AWG according to a transfer function of the AWG; and wherein the transfer function of the AWG defines a connectivity between:

the add port of the AWG, as an input port; and the common and auxiliary ports of the AWG, as output ports, wherein the transfer function is based on wavelength of a signal input to the add port.

8. The optical node of claim 7, wherein:

the AWG comprises a plurality of add ports and a corresponding plurality of operational wavelengths; and the optical transfer module is configured to couple signals received on the respective add ports as follows:

to the common port when a wavelength of a signal received on an add port of the AWG matches an operational wavelength of that add port, and to the auxiliary port when a wavelength of a signal received on an add port of the AWG is adjacent to an operational wavelength of that add port, according to a transfer function of the AWG.

9. An optical node configured to multiplex optical signals, the optical node comprising:

an add port;

a common port;

an auxiliary port;

an optical transfer module; and a monitoring element configured to monitor optical signal power of an optical signal received on the auxiliary port, wherein:

the optical transfer module is configured to couple a signal received on the add port to:

the common port, when a wavelength of the signal received on the add port matches an operational wavelength of the optical node, and the auxiliary port, when the wavelength of the signal received on the add port does not match an operational wavelength of the optical node, the optical transfer module comprises first and second planar regions and a plurality of waveguides coupling the planar regions;

the optical node further comprises an Arrayed Waveguide Grating (AWG) having a plurality of add ports and a corresponding plurality of operational wavelengths; and the optical transfer module is configured to couple signals received on the respective add ports of the AWG as follows:

to the common port when a wavelength of a signal received on an add port of the AWG matches an operational wavelength of that add port, and to the auxiliary port when a wavelength of a signal received on an add port of the AWG is adjacent to an operational wavelength of that add port, according to a transfer function of the AWG.

10. The optical node of claim 9, being further configured to:

receive, at the add port, a plurality of optical signals transmitted by an optical transceiver;

monitor, at the monitoring element, optical signal power received on the auxiliary port;

identify a transmission wavelength at which a power transition of the monitored optical signal power occurs;

select an operational wavelength as a function of the identified transmission wavelength; and communicate the selected operational wavelength to the optical transceiver.

11. The optical node of claim 7, wherein the AWG includes at least one of the following: a cyclic 2-port AWG and a non-cyclic AWG.

* * * * *